US012085391B2

(12) United States Patent
Tsujii

(10) Patent No.: US 12,085,391 B2
(45) Date of Patent: Sep. 10, 2024

(54) POSITIONING APPARATUS, POSITIONING METHOD, AND PROGRAM

(71) Applicant: SONY CORPORATION, Tokyo (JP)

(72) Inventor: Takahiro Tsujii, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 595 days.

(21) Appl. No.: 16/972,659

(22) PCT Filed: Jun. 19, 2019

(86) PCT No.: PCT/JP2019/024214
§ 371 (c)(1),
(2) Date: Dec. 7, 2020

(87) PCT Pub. No.: WO2020/008878
PCT Pub. Date: Jan. 9, 2020

(65) Prior Publication Data
US 2021/0247189 A1    Aug. 12, 2021

Related U.S. Application Data

(60) Provisional application No. 62/693,019, filed on Jul. 2, 2018.

(51) Int. Cl.
*G01C 21/16* (2006.01)
*G06N 20/00* (2019.01)

(52) U.S. Cl.
CPC ........... *G01C 21/188* (2020.08); *G06N 20/00* (2019.01)

(58) Field of Classification Search
CPC ..... G01C 21/188; G01C 22/006; G06N 20/00
See application file for complete search history.

(56) References Cited

U.S. PATENT DOCUMENTS 6,522,266 B1   2/2003  Soehren et al.
9,268,026 B2*  2/2016  Shin ..................... G01S 19/425
(Continued)

FOREIGN PATENT DOCUMENTS

JP   H03-148009 A   6/1991
JP   2007-240194 A  9/2007
(Continued)

OTHER PUBLICATIONS

Changhao Chen et al., IONet: Learning to Cure the Curse of Drift in Inertial Odometry, arXiv.org, Jan. 30, 2018, pp. 1-9.

*Primary Examiner* — Rami Khatib
(74) *Attorney, Agent, or Firm* — Paratus Law Group, PLLC

(57) ABSTRACT

There is provided a positioning apparatus, a positioning method, and a program that make it possible to perform positioning with a high degree of accuracy using an acceleration sensor and an angular velocity sensor. A movement vector is estimated using a machine learning model on the basis of acceleration of a device and an angular velocity of the device, the movement vector indicating a movement amount and a movement direction of the device, the acceleration being detected by an acceleration sensor that is used to detect the acceleration, the angular velocity being detected by an angular velocity sensor that is used to detect the angular velocity. Then, the estimated movement vector is integrated, and a relative position of the device is calculated. For example, the present technology is applicable to a positioning apparatus that measures a position of, for example, a pedestrian.

17 Claims, 24 Drawing Sheets

(56) References Cited

U.S. PATENT DOCUMENTS

| | | | | |
|---|---|---|---|---|
| 9,803,983 | B2* | 10/2017 | Czompo | G01C 21/165 |
| 10,330,492 | B2* | 6/2019 | Wei | G01C 22/006 |
| 2010/0159947 | A1* | 6/2010 | Imafuku | G01S 19/49 |
| | | | | 455/456.1 |
| 2010/0176988 | A1* | 7/2010 | Maezawa | G01S 19/45 |
| | | | | 342/357.25 |
| 2010/0188284 | A1* | 7/2010 | Anand | G01S 19/47 |
| | | | | 342/357.25 |
| 2011/0105957 | A1* | 5/2011 | Kourogi | G01C 22/00 |
| | | | | 600/595 |
| 2015/0211863 | A1* | 7/2015 | Kourogi | G01P 15/00 |
| | | | | 702/141 |
| 2016/0011004 | A1* | 1/2016 | Matsumoto | G01C 22/006 |
| | | | | 702/96 |
| 2018/0284815 | A1* | 10/2018 | Cui | B64C 39/024 |
| 2020/0158533 | A1* | 5/2020 | Sekiguchi | G01C 21/206 |

FOREIGN PATENT DOCUMENTS

| | | |
|---|---|---|
| JP | 2010-122034 A | 6/2010 |
| JP | 2012194175 A | 10/2012 |
| JP | 2016001875 A | 1/2016 |
| JP | 2016-218026 A | 12/2016 |
| JP | 2017-111098 A | 6/2017 |
| JP | 2018-042672 A | 3/2018 |
| JP | 2018-054414 A | 4/2018 |

* cited by examiner

| Classification | Factor that can be handled using present technology | Error in movement amount | Error in movement direction |
|---|---|---|---|
| Factor related to motion | Looking away while walking | | ○ |
| | STOP & GO, walking slowly | ○ | |
| | Avoiding person | ○ | ○ |
| | Running | ○ | |
| | Walking sideways | ○ | ○ |
| | Individual difference in how to walk | ○ | ○ |
| Factor related to individual | Individual difference in how to hold/wear terminal | ○ | ○ |
| | Difference in shoes that individual is wearing (sneakers, leather shoes, high heels) | ○ | |
| Factor related to environment | Stairs | ○ | |
| | Slope | ○ | |

FIG.16

POSITIONING APPARATUS, POSITIONING METHOD, AND PROGRAM

CROSS REFERENCE TO PRIOR APPLICATION

This application is a National Stage Patent Application of PCT International Patent Application No. PCT/JP2019/024214 (filed on Jun. 19, 2019) under 35 U.S.C. § 371, which claims priority to U.S. Patent Application No. 62/693,019 (filed on Jul. 2, 2018), which are all hereby incorporated by reference in their entirety.

TECHNICAL FIELD

The present technology relates to a positioning apparatus, a positioning method, and a program, and in particular, to a positioning apparatus, a positioning method, and a program that are used to measure the position of a measurement target such as a pedestrian using an acceleration sensor and an angular velocity sensor.

BACKGROUND ART

Pedestrian dead reckoning (PDR) is known as a technology used to measure the position of a pedestrian using an acceleration sensor and an angular velocity sensor.

As a dead reckoning apparatus using the PDR technology, Patent Literature 1 discloses obtaining an average length of stride of a pedestrian in advance, and calculating a distance traveled by the pedestrian on the basis of the number of steps and the average length of stride of the pedestrian, the number of steps of the pedestrian being detected from measurement data.

Further, Patent Literature 2 discloses acquiring a less erroneous reference position and movement direction when switching to positioning performed using PDR from another positioning performed using, for example, the Global Positioning System (GPS) is performed, the less erroneous reference position and movement direction being calculated from a positioning result obtained by the other positioning being performed; and starting performing positioning using PDR on the basis of the acquired reference position and movement direction.

Furthermore, Patent Literature 3 discloses a technology used to estimate a movement direction from data obtained using an acceleration sensor, a geomagnetic sensor, and GPS positioning.

CITATION LIST

Patent Literature

Patent Literature 1: Japanese Patent Application Laid-open No. 2016-218026
Patent Literature 2: Japanese Patent Application Laid-open No. 2017-111098
Patent Literature 3: Japanese Patent Application Laid-open No. 2018-54414

DISCLOSURE OF INVENTION

Technical Problem

There is a demand that positioning be performed with a high degree of accuracy using an acceleration sensor and an angular velocity sensor.

The present technology has been achieved in view of the circumstances described above, and in particular, it is an object of the present technology to make it possible to perform positioning with a high degree of accuracy using an acceleration sensor and an angular velocity sensor.

Solution to Problem

A positioning apparatus or a program of an aspect of the present technology, the positioning apparatus including a movement vector estimator that estimates a movement vector using a machine learning model on the basis of acceleration of a device and an angular velocity of the device, the movement vector indicating a movement amount and a movement direction of the device, the acceleration being detected by an acceleration sensor that is used to detect the acceleration, the angular velocity being detected by an angular velocity sensor that is used to detect the angular velocity; and an integration section that integrates the movement vector and calculates a relative position of the device, the program causing a computer to operate as the positioning apparatus.

A positioning method of an aspect of the present technology, the positioning method including estimating, by a movement vector estimator included in a positioning apparatus, a movement vector using a machine learning model on the basis of acceleration of a device and an angular velocity of the device, the movement vector indicating a movement amount and a movement direction of the device, the acceleration being detected by an acceleration sensor that is used to detect the acceleration, the angular velocity being detected by an angular velocity sensor that is used to detect the angular velocity; and integrating, by an integration section included in the positioning apparatus, the movement vector and calculates a relative position of the device.

In a positioning apparatus, a positioning method, and a program of an aspect of the present technology, a movement vector is estimated using a machine learning model on the basis of acceleration of a device and an angular velocity of the device, the movement vector indicating a movement amount and a movement direction of the device, the acceleration being detected by an acceleration sensor that is used to detect the acceleration, the angular velocity being detected by an angular velocity sensor that is used to detect the angular velocity. Then, the movement vector is integrated, and a relative position of the device is calculated.

BRIEF DESCRIPTION OF DRAWINGS

FIG. 16 illustrates a factor that causes an error in detection of a movement amount or a movement direction that is performed by the comparative apparatus and can be handled by the present technology with a sufficient degree of accuracy.

MODE(S) FOR CARRYING OUT THE INVENTION

Embodiments of the present technology will now be described below with reference to the drawings.

<<Outline of Positioning Apparatus to Which Present Technology is Applied>>

When PDR is used, the number of steps of a pedestrian is detected, and a movement distance is estimated on the basis of the number of steps and a length of stride, as disclosed in Patent Literature 1.

However, there is a change in length of stride according to individual, or according to the walking situation such as an ambulatory motion and a walking place. The change in length of stride causes an error in a movement amount, and this results in a decrease in positioning accuracy.

In Patent Literature 1, an average length of stride is measured for each pedestrian, and a movement amount is calculated using the measured average length of stride. Thus, an error in a movement amount that is caused due to a difference in length of stride between individuals is reduced.

However, there will be a difference in the length of stride of the same individual if there is a difference in the walking condition such as how to walk and a walking place. Thus, it is difficult to improve the positioning accuracy under various walking conditions.

Further, the technology disclosed in Patent Literature 2 achieves an improvement in accuracy with respect to a position and a movement direction of a pedestrian when positioning is started. However, the technology does not achieve an improvement in the positioning accuracy subsequently performed using an acceleration sensor and an angular velocity sensor.

Furthermore, the technology disclosed in Patent Literature 3 is a technology used to estimate a movement direction using a result of positioning performed using the GPS, and is different from a technology used to perform positioning using an acceleration sensor and an angular velocity sensor since there is a need to perform positioning using the GPS.

Figure 1:
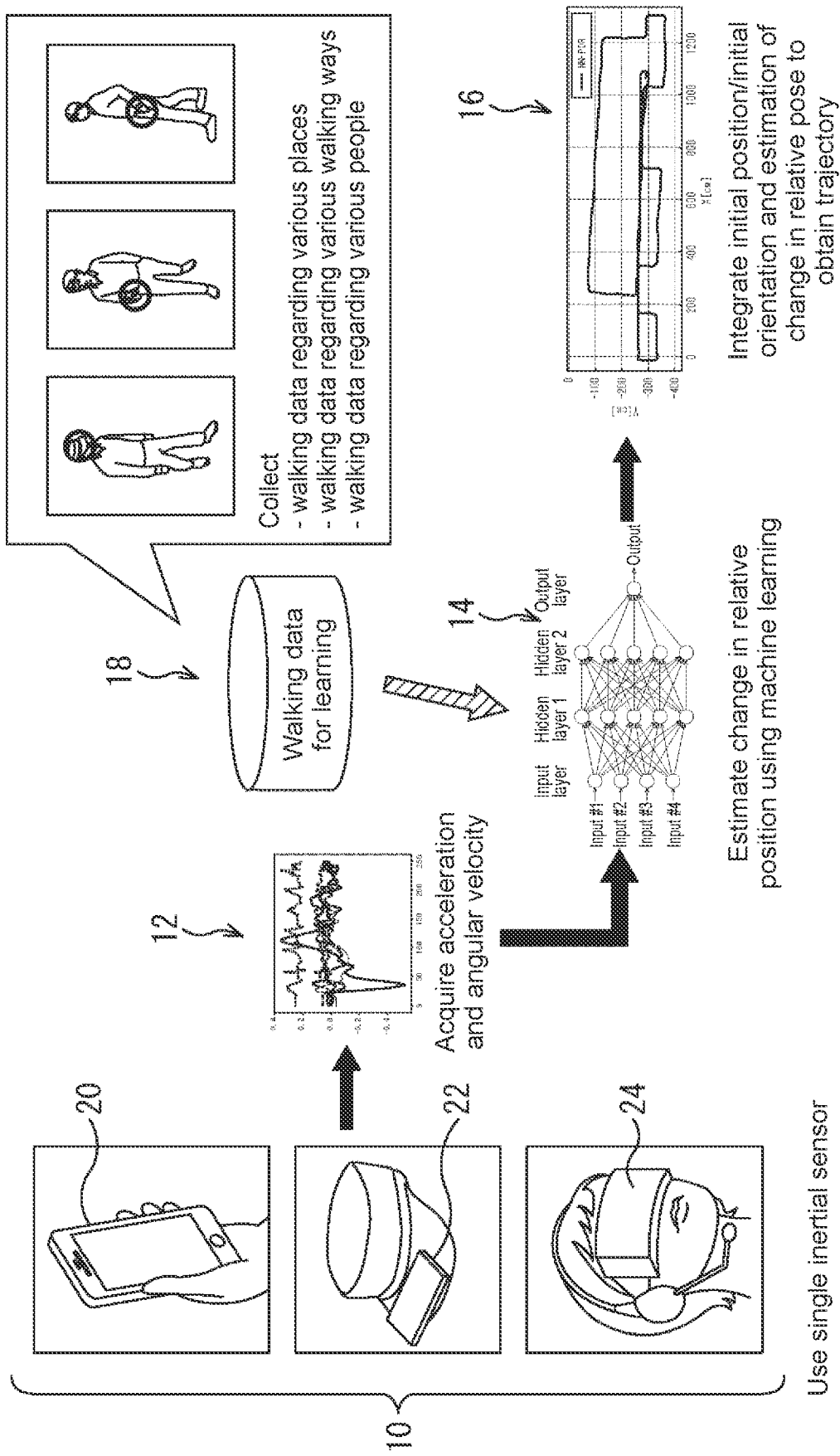
FIG. 1 illustrates an outline of a positioning method according to the present technology.

FIG. 1 illustrates an outline of a positioning method to which the present technology is applied.

The positioning method described with reference to FIG. 1 is an example in which the positioning target is a pedestrian, and a positioning apparatus 10 to which the present technology is applied is included in a smartphone 20 held (carried) by the pedestrian, or is attached to a wearable article, such as a cap worn by the pedestrian, as a dedicated apparatus 22. Note that the positioning apparatus 10 may be mounted on or built in an apparatus held by a target who does not intend to walk, such as a head-mounted display (HMD) 24 that is used for, for example, virtual reality (VR), augmented reality (AR), or mixed reality (MR).

As described later, the positioning apparatus 10 includes a three-axis acceleration sensor and a three-axis angular velocity sensor as an inertial sensor, and obtains, from the acceleration sensor and the angular velocity sensor, sensor data 12 of FIG. 1 that indicates acceleration and an angular velocity that are produced by a motion of the pedestrian.

Subsequently, the positioning apparatus 10 inputs the sensor data 12 to a machine learning model 14 illustrated in FIG. 1 that is built using an algorithm for machine learning. The machine learning model 14 estimates (calculates) a movement vector indicating a movement amount and a movement direction of the positioning apparatus 10 on the basis of the input sensor data 12. The movement vector indicates a change in a relative position of the positioning apparatus 10 from a previous estimation of a movement vector.

The machine learning model 14 is trained (is caused to perform learning) in advance using walking data 18 for learning illustrated in FIG. 1. The walking data 18 for learning is generated from data collected on the assumption of various situations, such as walking data when an inertial sensor is attached to various places, walking data when walking in various ways, and walking data when an inertial sensor is attached to various people.

Next, the positioning apparatus 10 integrates the movement vector estimated by the machine learning model 14, an initial position and an initial orientation of the positioning apparatus 10 in a real space, and estimation information regarding estimation of a change in a relative pose of the positioning apparatus 10. Due to the integration, the positioning apparatus 10 obtains a position through which the positioning apparatus 10 has passed in the real space, and obtains a movement trajectory of the positioning apparatus 10 (the pedestrian) in the real space, as indicated by trajectory data 16 illustrated in FIG. 1.

<<Embodiment of Positioning Apparatus 10 to which Present Technology is Applied>>

Figure 2:
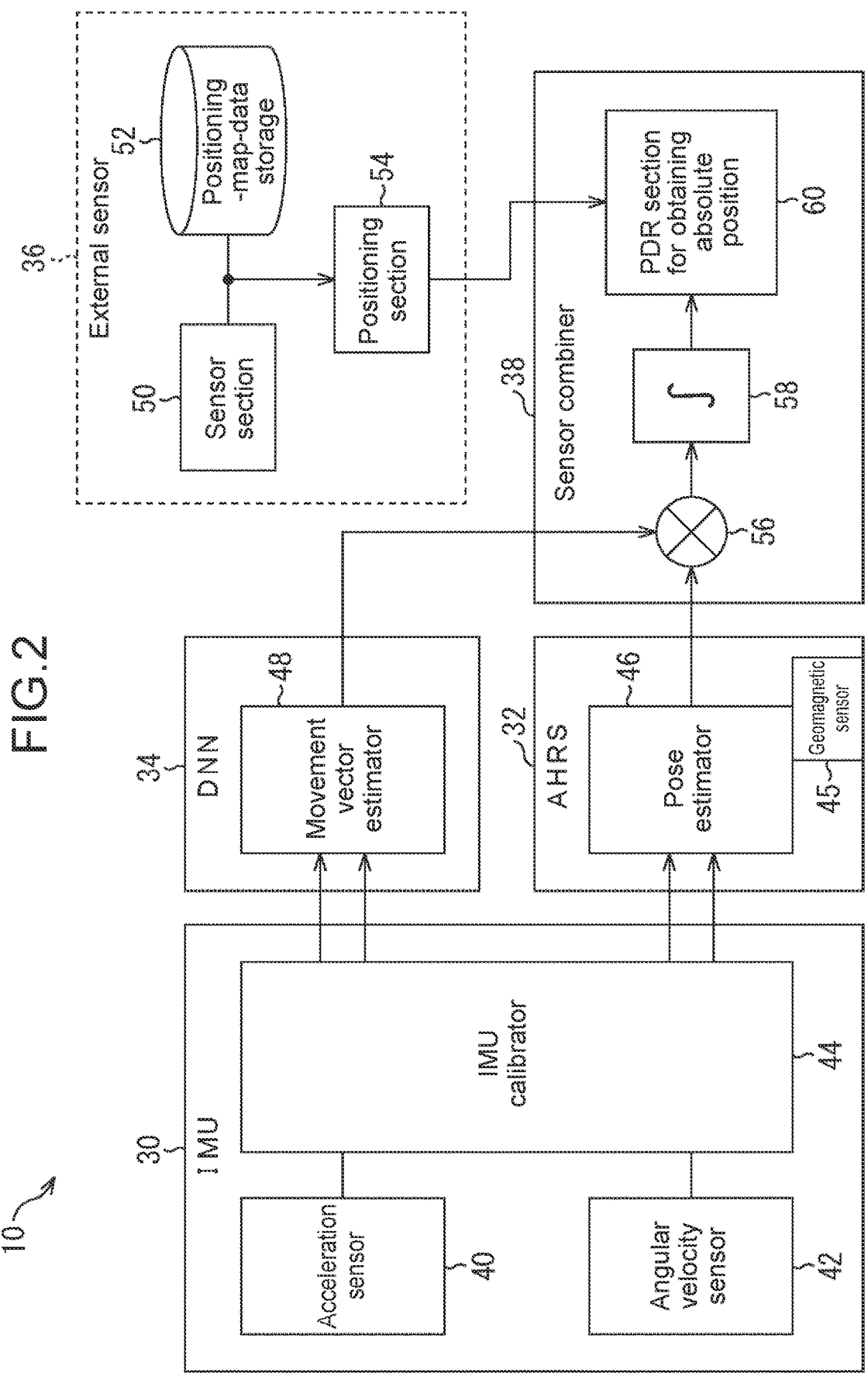
FIG. 2 is a block diagram of a configuration example of an embodiment of a positioning apparatus to which the present technology is applied.

FIG. 2 is a block diagram of a configuration example of an embodiment of the positioning apparatus 10 to which the present technology is applied. It is assumed that, in the present embodiment, all of the structural components illustrated in FIG. 2 are integrated through, for example, a support, and the positioning apparatus 10 is held (being mounted, being grasped, or the like) at a desired portion of an arbitrary movable body, such as a pedestrian or an automobile, that is a positioning target. In the following description, the positioning target is assumed to be a pedestrian.

The positioning apparatus 10 includes an inertial measurement unit (IMU) 30, an attitude heading reference system 32 (AHRS), a deep neural network (DNN) 34, an external sensor 36, and a sensor combiner 38.

The IMU 30 is an inertial sensor, and includes a three-axis acceleration sensor 40, a three-axis angular velocity sensor 42, and an IMU calibrator 44. The acceleration sensor 40, the angular velocity sensor 42, and the IMU calibrator 44 are integrally held with a frame.

The acceleration sensor 40 detects acceleration that is produced in a device and is acceleration in directions of respective three axes orthogonal to each other, and supplies an acceleration signal indicating a magnitude and an orientation of the detected acceleration in the directions of the three axes to the IMU calibrator 44. Note that the device refers to a support that supports the acceleration sensor 40 and the angular velocity sensor 42.

The angular velocity sensor 42 detects an angular velocity that is produced in the device and is an angular velocity around respective three axes orthogonal to each other, and supplies an angular velocity signal depending on a magnitude and an orientation of the detected angular velocity around the three axes to the IMU calibrator 44.

(Device Coordinate System)

Here, when the three axes along which the acceleration sensor 40 detects acceleration are an x-axis, a y-axis, and a z-axis, the acceleration sensor 40 and the angular velocity sensor 42 are fixed to the device such that the three axes around which the angular velocity sensor 42 detects an angular velocity are also the x-axis, the y-axis, and the z-axis. A coordinate system having the x-axis, the y-axis, and the z-axis as coordinate axes is referred to as a device coordinate system (a local coordinate system). The device coordinate system is a coordinate system fixed to the device. As illustrated in, for example, FIG. 3, the x-axis, the y-axis, and the z-axis represent three axes of directions that are determined in advance with respect to the positioning apparatus 10 moving integrally with the device.

The IMU calibrator 44 performs calibration processing such as a bias removal and a gain adjustment with respect to an acceleration signal and an angular velocity signal that are respectively supplied by the acceleration sensor 40 and the angular velocity sensor 42, and reduces a measurement error.

Then, with respect to the acceleration signal and the angular velocity signal on which calibration processing have been performed, the IMU calibrator 44 supplies those signals to the DNN 34 and the AHRS 32 at specified output intervals as acceleration data and angular velocity data that are pieces of digital data. In the present embodiment, the output interval at which the acceleration data and the angular velocity data are output is 0.02 seconds (a frequency of 50 Hz), but is not limited thereto.

Note that the acceleration data of acceleration in the directions of the three axes of x, y, and z is represented by $(A_x, A_y, A_z)$, and the angular velocity data of angular velocity around the respective axes of x, y, and z is represented by $(\omega_x, \omega_y, \omega_z)$.

In FIG. 2, the AHRS 32 includes a geomagnetic sensor 45 and a pose estimator 46.

The geomagnetic sensor 45 detects geomagnetism in the directions of the three axes of x, y, and z in the device coordinate system, and supplies, to the pose estimator 46, a geomagnetic signal depending on a magnitude and an orientation of the geomagnetism in the directions of the three axes of x, y, and z.

The pose estimator 46 detects (estimates) a pose of the IMU 30 on the basis of the acceleration data $(A_x, A_y, A_z)$ and the angular velocity data $(\omega_x, \omega_y, \omega_z)$ from the IMU calibrator 44 of the IMU 30, and the geomagnetic signal from the geomagnetic sensor 45.

Specifically, the pose estimator 46 detects a vertical direction (a direction of the gravitational acceleration) in the device coordinate system on the basis of the acceleration data $(A_x, A_y, A_z)$ and the angular velocity data $(\omega_x, \omega_y, \omega_z)$ from the IMU calibrator 44.

Note that the method for detecting the vertical direction on the basis of the acceleration data $(A_x, A_y, A_z)$ and the angular velocity data $(\omega_x, \omega_y, \omega_z)$ is well known, and a detailed description thereof is omitted. Further, it is also possible to detect the vertical direction only from the acceleration data $(A_x, A_y, A_z)$, and any method for detecting the vertical direction may be adopted.

Further, the pose estimator 46 detects a geomagnetic direction in the device coordinate system on the basis of a geomagnetic signal from the geomagnetic sensor 45, and determines the detected geomagnetic direction as a magnetic-north direction in the device coordinate system.

The pose estimator 46 detects a true-north direction in the device coordinate system on the basis of the detected magnetic-north direction and the detected vertical direction in the device coordinate system. Note that the true-north direction is orthogonal to the vertical direction.

Then, the pose estimator 46 supplies, to the sensor combiner 38, the vertical direction and the true-north direction in the device coordinate system at specified output intervals as pose data that indicates a pose of the IMU 30 (hereinafter referred to as a pose of a device). In the present embodiment, the output interval at which the pose data is output is one second (a frequency of 1 Hz), but is not limited thereto.

(Other Modes of Pose Estimation)

Note that the pose of the device may be estimated by the pose estimator 46 as indicated below.

First, at the start of pose estimation, the pose estimator 46 detects the vertical direction in the device coordinate system on the basis of the acceleration data $(A_x, A_y, A_z)$ and the angular velocity data $(\omega_x, \omega_y, \omega_z)$, and detects the magnetic-north direction in the device coordinate system on the basis of a geomagnetic signal from the geomagnetic sensor 45. Then, the pose estimator 46 calculates the true-north direction in the device coordinate system on the basis of the detected vertical direction and the detected magnetic-north direction.

The pose estimator 46 supplies, to the sensor combiner 38, the vertical direction and the true-north direction in the device coordinate system as pose data that indicates an initial pose of the device (an initial orientation), the vertical direction and the true-north direction in the device coordinate system being obtained using the geomagnetic signal from the geomagnetic sensor 45, as described above. Thereafter, without referring to the geomagnetic signal from the geomagnetic sensor 45, the pose estimator 46 detects a rotational movement of the device on the basis of the angular velocity data ($\omega x$, $\omega y$, $\omega z$) from the IMU calibrator 44 to update the vertical direction and the true-north direction in the device coordinate system.

Accordingly, the pose estimator 46 updates the pose data indicating the vertical direction and the true-north direction in the device coordinate system every time the angular velocity data ($\omega x$, $\omega y$, $\omega z$) is supplied by the IMU calibrator 44 every second, and supplies the updated pose data to the sensor combiner 38. Note that, when the vertical direction and the true-north direction continue to be updated without using the geomagnetic signal from the geomagnetic sensor 45, an error between the vertical direction and the true-north direction is accumulated to be gradually increased. Thus, the processing in this mode may be performed from the beginning at an appropriate timing.

Here, the AHRS 32 does not necessarily have to include the geomagnetic sensor 45. The pose estimator 46 may acquire information regarding the magnetic-north direction (or the true-north direction) from an external geomagnetic sensor when the AHRS 32 does not include the geomagnetic sensor 45. Further, the pose estimator 46 may recognize that a specific direction in the device coordinate system (of the positioning apparatus 10) is the magnetic-north direction when a pedestrian performs a specified operation, with the specific direction in the device coordinate system (of the positioning apparatus 10) being oriented toward the magnetic-north direction. Furthermore, the pose estimator 46 may acquire information regarding the true-north direction from an external GNSS receiver (such as an external sensor 36 described later), a pose-estimation sensor such as an earth-rotation sensor, or map information. Note that, when the positioning apparatus 10 includes a plurality of GNSS receivers, this enables the pose estimator 46 to detect the true-north direction in the device coordinate system on the basis of values of latitude, longitude, and altitude that are detected by the plurality of GNSS receivers. Moreover, the pose estimator 46 is capable of detecting the true-north direction in the device coordinate system from information regarding speed of the device (a movement direction of the device) that is obtained from the GNSS receiver and a movement direction of the device that is estimated by a movement vector estimator 48 described later.

Further, with respect to the detection of the vertical direction and the true-north direction in the device coordinate system, that is, detection of an absolute pose of the device, a portion of the detection processing may be performed by the sensor combiner 38 with all of the detection processing not being performed by the pose estimator 46.

For example, the pose estimator 46 detects a change in a relative pose of the device to an initial absolute pose (a change in relative pose), or a change in a relative pose of the device for each specified period of time on the basis of the angular velocity data ($\omega x$, $\omega y$, $\omega z$) from the IMU calibrator 44, and supplies the detected change in relative pose to the sensor combiner 38 as the pose data. Further, the pose estimator 46 also supplies, to the sensor combiner 38 and as the pose data, information regarding the vertical direction in the device coordinate system on the basis of the acceleration data (Ax, Ay, Az) from the IMU calibrator 44.

The sensor combiner 38 detects the magnetic-north direction or true-north direction in the device coordinate system on the basis of data obtained from, for example, the geomagnetic sensor 45, the external sensor 36 described later, a pose-estimation sensor such as an earth-rotation sensor, or map information. Then, the sensor combiner 38 detects an initial absolute pose of the device using information regarding the detected magnetic-north direction or true-north direction, and the information regarding the vertical direction from the pose estimator 46. After the sensor combiner 38 detects the initial absolute pose of the device, the sensor combiner 38 detects an absolute pose of the device on the basis of the initial absolute pose of the device and information regarding the change in the relative pose of the device that is supplied by the pose estimator 46.

The DNN 34 includes the movement vector estimator 48 performing arithmetic processing using a machine learning model.

On the basis of the acceleration data (Ax, Ay, Az) and the angular velocity data ($\omega x$, $\omega y$, $\omega z$) that are supplied by the IMU calibrator 44 of the IMU 30, the movement vector estimator 48 estimates (calculates) a movement vector M in the device coordinate system that indicates a movement amount and a movement direction of movement performed by the device. Then, the movement vector estimator 48 supplies the estimated movement vector M to the sensor combiner 38 at specified output intervals. In the present embodiment, the output interval at which the movement vector M is output is one second (a frequency of 1 Hz), but is not limited thereto.

The movement vector M is estimated using a machine learning model that is built on the basis of an algorithm for machine learning, and the movement vector estimator 48 performs arithmetic processing using a machine learning model that is trained in advance to estimate the movement vector M.

Input data for the machine learning model is sensor data (Ax, Ay, Az, $\omega x$, $\omega y$, $\omega z$) for six axes in total that is the acceleration data (Ax, Ay, Az) and the angular velocity data ($\omega x$, $\omega y$, $\omega z$) that are supplied by the IMU calibrator 44. Further, output data for the machine learning model with respect to the input data is a movement vector M in the device coordinate system that indicates a movement amount and a movement direction of movement that is estimated to have been performed by the device for a specified period of time for estimating a movement vector.

Specifically, the output data is a component value of the estimated movement vector M of the directions of the three axes of x, y, and z (an xyz component value) in the device coordinate system, and the xyz component value of the movement vector M in the device coordinate system is represented by (Mx, My, Mz).

The period of time for estimating a movement vector indicates a period of time from calculation of a previously estimated movement vector M to calculation of a currently estimated movement vector M. The period of time for estimating a movement vector is synchronized with (coincides) the output interval at which the estimated movement vector M is supplied to the sensor combiner 38, and the period of time for estimating a movement vector is one second in the present embodiment (a frequency of 1 Hz). Thus, the movement vector M estimated by the movement vector estimator 48 indicates a movement amount and a movement direction of movement performed by the device for one second.

The external sensor 36 is a positioning sensor using the Global Positioning System (GPS), which is one of the global navigation satellite systems (GNSS) using an artificial satellite.

The external sensor 36 includes a sensor section 50, a positioning-map-data storage 52, and a positioning section 54.

The sensor section 50 receives a satellite radio signal transmitted from a plurality of (for example, four) low earth orbiting GPS satellites, and extracts information that is included in the satellite radio signal, and is information such as orbit information that indicates a satellite position and time information that indicates a transmission time. Then, the sensor section 50 supplies the extracted information to the positioning section 54 as satellite reception data.

The positioning-map-data storage 52 stores therein map data that associates latitude, longitude, and altitude in a geographic coordinate system with data of, for example, a road shape, a road width, a road name, a building, various facilities, a geographical name, and a landform.

On the basis of the satellite reception data from the sensor section 50 and the map data stored in the positioning-map-data storage 52, the positioning section 54 calculates values of latitude, longitude, and altitude in the geographic coordinate system on the earth as a position of the device at the time of receiving a satellite radio signal.

In other words, on the basis of the orbit information and the time information that are included in the satellite reception data from the sensor section 50, the positioning section 54 calculates a coordinate value G (latitude value, longitude value, altitude value) in the geographic coordinate system that indicates a position of the device at the time of receiving a satellite radio signal.

Further, the positioning section 54 acquires map data around the calculated coordinate value G from the positioning-map-data storage 52, and corrects the coordinate value G as appropriate on the basis of the acquired map data. For example, when the positioning section 54 determines that the position of the coordinate value G is a position at which the device is unable to physically exist on a map indicated by the map data acquired from the positioning-map-data storage 52, the positioning section 54 performs correction on the coordinate value G to obtain an appropriate coordinate value for a position situated near the position of the coordinate value G.

Various methods for correcting a coordinate value G are well known, and any method may be used. Further, correction itself does not necessarily have to be performed.

The positioning section 54 supplies the coordinate value G (latitude value, longitude value, altitude value) in the geographic coordinate system to the sensor combiner 38 at specified output intervals as external positioning data that indicates a current position of the device, the coordinate value G being obtained by performing the processing described above. In the present embodiment, the output interval at which the external positioning data is output is one second, but is not limited thereto. The positioning section 54 may supply the external positioning data to the sensor combiner 38 only when a request is made by the sensor combiner 38, which will be described later.

The sensor combiner 38 includes a coordinate converter 56, an integration section 58, and a PDR section 60 for obtaining an absolute position.

On the basis of the pose data from the pose estimator 46 of the AHRS 32, the coordinate converter 56 converts, into a movement vector MG in a world coordinate system described later, the movement vector M in the device coordinate system from the movement vector estimator 48 of the DNN 34.

Specifically, on the basis of the pose data from the pose estimator 46, the coordinate converter 56 converts the xyz component value (Mx, My, Mz) in the device coordinate system into an XYZ component value (MX, MY, MZ) in the world coordinate system, the xyz component value (Mx, My, Mz) being a xyz component value of the movement vector M from the movement vector estimator 48.

The coordinate converter 56 supplies the movement vector MG in the world coordinate system to the integration section 58 at specified output intervals. In the present embodiment, the output interval at which the movement vector MG is output is one second, but is not limited thereto.

(World Coordinate System)

Figure 3:
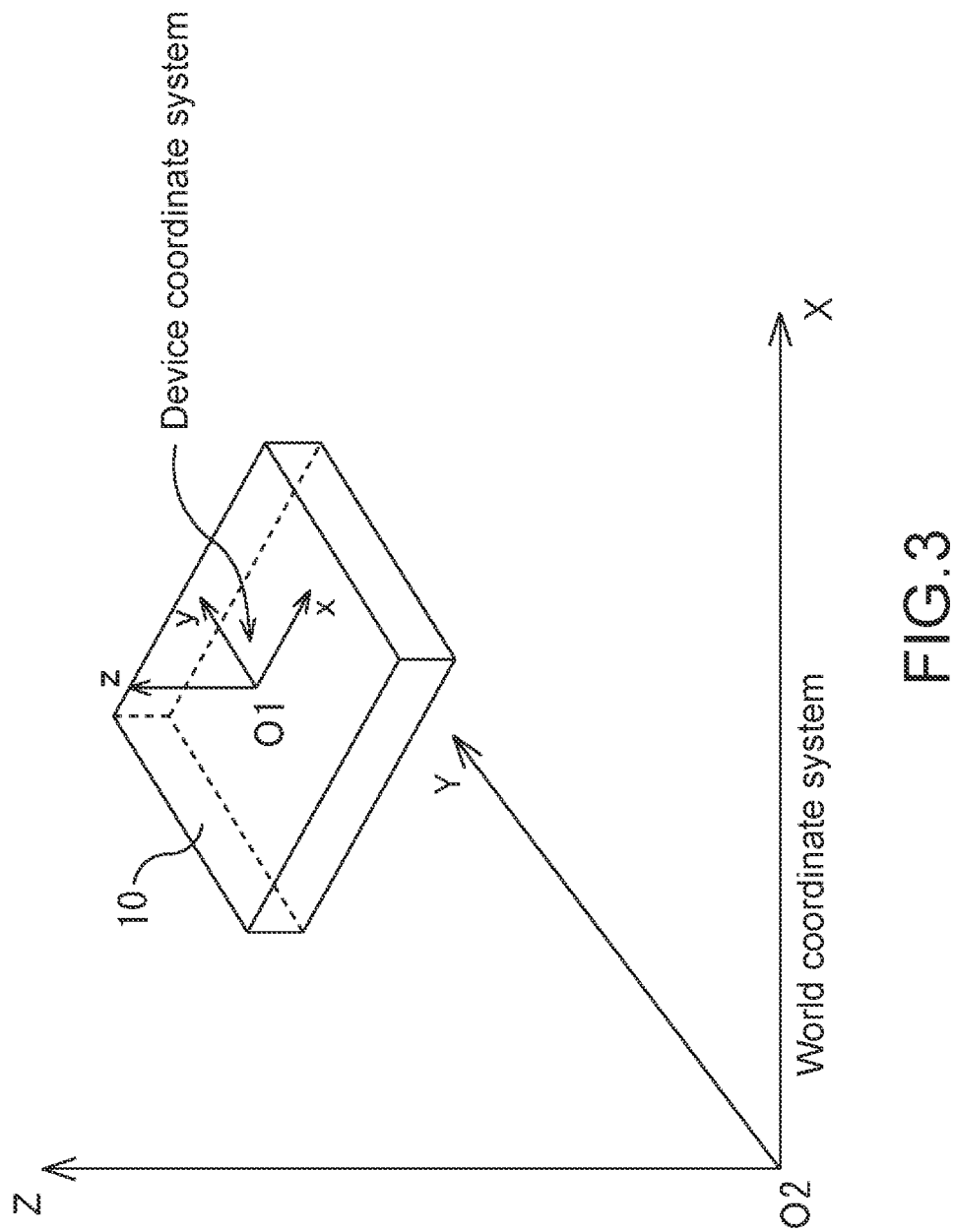
FIG. 3 illustrates a device coordinate system and a world coordinate system.

Here, the world coordinate system is a coordinate system fixed in the real space, with three axes of an X-axis, a Y-axis, and a Z-axis that are orthogonal to each other being coordinate axes. as illustrated in FIG. 3. Note that the world coordinate system is set such that the true-north direction and the vertical direction are directions determined in advance. For example, the world coordinate system is set such that the true-north direction is represented by a Y-axis direction and the vertical direction is represented by a direction opposite to a Z-axis direction.

(Pose Data)

The coordinate converter 56 specifies three directions of the x-axis, the y-axis, and the z-axis of the device coordinate system in the world coordinate system, on the basis of the vertical direction and the true-north direction that are represented by the device coordinate system and indicated by the pose data from the pose estimator 46. In other words, the coordinate converter 56 specifies three directions of the x-axis, the y-axis, and the z-axis of the device coordinate system in the world coordinate system in a state in which the vertical direction and the true-north direction that are represented by the device coordinate system and indicated by the pose data respectively coincide a vertical direction and a true-north direction in the world coordinate system.

(Description of Coordinate Conversion)

Figure 4:
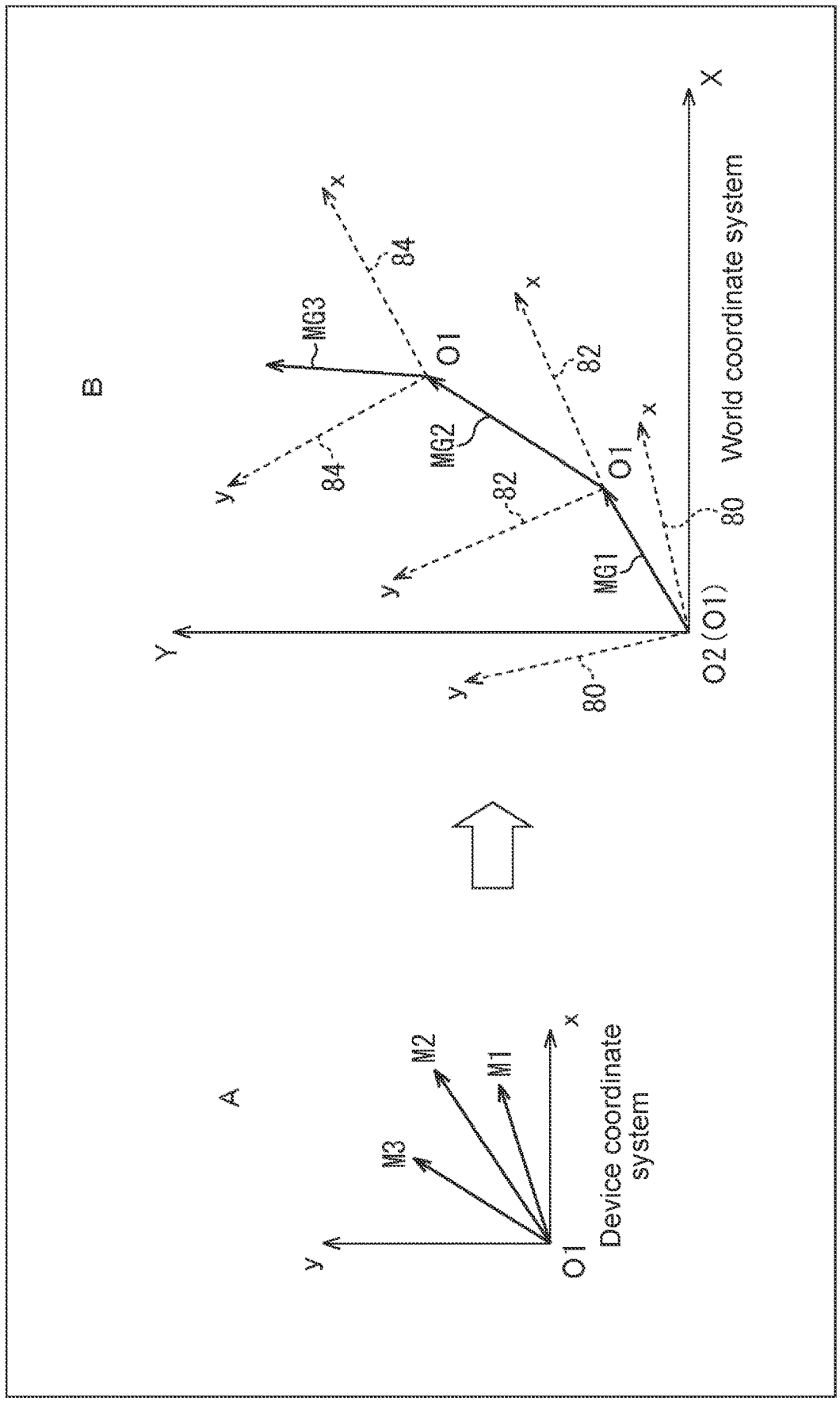
FIG. 4 is a diagram describing contents of processing performed by a coordinate converter.

FIG. 4 is a diagram describing contents of processing performed by the coordinate converter 56. Note that, in the figure, the z-axis in the device coordinate system and the Z-axis in the world coordinate system that are directions orthogonal to the surface of the sheet of the figure are omitted, and only the x-axis and the y-axis in the device coordinate system and the X-axis and the Y-axis in the world coordinate system are illustrated. The device coordinate system is represented by O1-$xy$, and the world coordinate system is represented by O2-XY. Further, it is assumed that the z-axis in the device coordinate system constantly coincide the Z-axis in the world coordinate system, and a change in a pose of the device is limited to a movement of rotation around the Z-axis (the z-axis).

In A of FIG. 4, movement vectors M1, M2, and M3 indicated in a device coordinate system O1-$xy$ are examples of the movement vectors M when the device is limited to being moved in two directions of the X-axis and Y-axis (the x-axis and the y-axis), the movement vectors M being supplied from the movement vector estimator 48 to the coordinate converter 56 in this order.

On the other hand, a device coordinate system 80 in a world coordinate system O2-XY illustrated in B of FIG. 4 indicates the device coordinate system O1-$xy$ when the movement vector M1 is estimated by the movement vector estimator 48. It is possible to grasp a spatial relationship between the device coordinate system O1-$xy$ and the world coordinate system O2-XY (a relationship with respect to a rotational movement) using the pose data from the pose estimator 46. The device coordinate system 80 is the device coordinate system O1-$xy$ when the device coordinate system O1-*xy* upon estimating the movement vector M1 is represented by the world coordinate system O2-XY on the basis of the pose data upon estimating the movement vector M1.

Further, a movement vector MG1 is represented in the device coordinate system 80, the movement vector MG1 being obtained by representing the movement vector M1 in the device coordinate system 80 while maintaining a magnitude and an orientation of the movement vector M1 in the device coordinate system O1-*xy*.

Note that the processing performed by the coordinate converter 56 is coordinate conversion with from the device coordinate system to the world coordinate system that is performed respect to a vector component, and a translational movement of the device coordinate system relative to the world coordinate system does not affect a conversion result. Thus, in B of FIG. 4, an origin O1 of the device coordinate system 80 coincides an origin O2 of the world coordinate system O2-XY for convenience.

As in the case of the device coordinate system 80, a device coordinate system 82 in the world coordinate system O2-XY illustrated in B of FIG. 4 is the device coordinate system O1-*xy* when the device coordinate system O1-*xy* upon estimating the movement vector M2 is represented by the world coordinate system O2-XY on the basis of the pose data upon estimating the movement vector M2, and a device coordinate system 84 in the world coordinate system O2-XY illustrated in B of FIG. 4 is the device coordinate system O1-*xy* when the device coordinate system O1-*xy* upon estimating the movement vector M3 is represented by the world coordinate system O2-XY on the basis of the pose data upon estimating the movement vector M3.

Further, a movement vector MG2 is represented in the device coordinate system 82, the movement vector MG2 being obtained by representing the movement vector M2 in the device coordinate system 82 while maintaining a magnitude and an orientation of the movement vector M2 in the device coordinate system O1-*xy*, and a movement vector MG3 is represented in the device coordinate system 84, the movement vector MG3 being obtained by representing the movement vector M3 in the device coordinate system 84 while maintaining a magnitude and an orientation of the movement vector M3 in the device coordinate system O1-*xy*.

Note that an origin O1 of the device coordinate system 82 is caused to coincide an end point of the movement vector MG1 such that a start point of the movement vector MG2 coincides the end point of the movement vector MG1, and an origin O1 of the device coordinate system 84 is caused to coincide an end point of the movement vector MG2 such that a start point of the movement vector MG3 coincides the end point of the movement vector MG2.

As indicated by the device coordinate systems 80, 82, and 84 and the movement vectors MG1, MG2, and MG3 illustrated in B of FIG. 4, an amount of movement of rotation of the device coordinate system 80, 82, 84 with respect to the world coordinate system O2-XY varies according to a pose of the device. An angle formed by the movement vectors MG1 and MG2, an angle formed by the movement vectors MG1 and MG3, and an angle formed by the movement vectors MG2 and MG3 are also respectively different from an angle formed by the movement vectors M1 and M2, an angle formed by the movement vectors M1 and M3, and an angle formed by the movement vectors M2 and M3 in the device coordinate system O1-*xy* illustrated in A of FIG. 4.

The movement of the device in the real space is represented by the movement vectors MG1, MG2, and MG3 in the world coordinate system O2-XY. Thus, the coordinate converter 56 converts the movement vectors M1, M2, and M3 in the device coordinate system O1-*xy* into the movement vectors MG1, MG2, and MG3 in the world coordinate system O2-XY. For example, coordinate conversion is performed on the movement vector M1 in the device coordinate system O1-*xy* such that an xy component value of the movement vector M1 in the device coordinate system O1-*xy* is converted into an XY component value obtained by rotating, about the Z-axis, a vector that is represented by the world coordinate system O2-XY and has an XY component value by an amount of movement of rotation of the device coordinate system 80 in the world coordinate system O2-XY about the Z axis. This results in calculating an XY component value of the movement vector MG that is obtained by converting the movement vector M in the device coordinate system O1-*xy* into the movement vector MG in the world coordinate system.

Here, the case in which a change in a pose of the device is limited to a movement of rotation around the Z-axis and the device is limited to being moved in two directions of the X-axis and the Y-axis, has been described. However, the xyz component value of the movement vector M in the device coordinate system is similarly converted into the XYZ component value of the movement vector MG in the world coordinate system without these limitations. In other words, coordinate conversion is performed on the movement vector M in the device coordinate system such that an xyz component value (Mx, My, Mz) of the movement vector M in the device coordinate system is converted into an XYZ component value (MX, MY, MZ) obtained by rotating, about the respective axes of X, Y, and Z, a vector that is represented by a world coordinate system O2-XYZ and has a an XYZ component value by an amount of movement of rotation of a device coordinate system O1-*xyz* in the world coordinate system O2-XYZ about the respective axes of X, Y, and Z. the movement vector M in the device coordinate system is coordinate-converted to the XYZ component value (MX, MY, MZ) when the vector having the xyz component value (Mx, My, Mz) as the XYZ component value of the world coordinate system O2-XYZ is rotated about each axis of the XYZ axis by the amount of the rotational movement of the device coordinate system O1-*xyz* around each axis of the XYZ axis in the world coordinate system O2-XYZ. This results in calculating an XYZ component value (MX, MY, MZ) of the movement vector MG that is obtained by converting the movement vector M in the device coordinate system into the movement vector MG in the world coordinate system.

As described above, when the movement vector M in the device coordinate system that is estimated by the movement vector estimator 48 is converted into the movement vector MG in the world coordinate system, this results in obtaining a movement amount and a movement direction of the device from which an effect due to a change in a pose of the device has been removed.

In FIG. 2, the integration section 58 integrates the movement vector MG from the coordinate converter 56 to calculate a displacement vector D, and supplies the calculated displacement vector D to the PDR section 60 for obtaining an absolute position at specified output intervals. In the present embodiment, the output interval at which the displacement vector D is output is one second in synchronization with the interval at which the movement vector MG is supplied from the coordinate converter 56. However, the output interval is not limited thereto.

(Integration of Movement Vector)

The integration of the movement vector MG is performed by integrating XYZ component values (MX, MY, MZ) of the movement vector MG for the respective components of an X component, a Y component, and a Z component, the XYZ component value (MX, MY, MZ) being supplied every second by the coordinate converter 56. Then, integration values DX, DY, and DZ for the respective components of the X component, the Y component, and the Z component that are obtained by the integration are used for an XYZ component value (DX, DY, DZ) of the displacement vector D. Thus, the displacement vector D is initially set to be a zero vector, and a movement vector MG is added to the displacement vector D every time a new movement vector MG is supplied from the coordinate converter 56. This results in updating the displacement vector D.

Here, when the movement vectors MG from the coordinate converter 56 are integrated to calculate the displacement vector D, the displacement of the device is estimated. In other words, with the position of the device in the real space and in the world coordinate system when integration starts to be performed by the integration section 58 (when the displacement vector D is a zero vector) being a reference position (an initial position), the displacement vector D indicates a displacement amount and a displacement direction of displacement of the device to a current position from the reference position in the real space and in the world coordinate system. Further, the displacement vector D indicates a relative current position (a relative position) of the device with respect to the reference position in the real space and in the device coordinate system.

<Description of Integration Performed by Integration Section 58>

Figure 5:
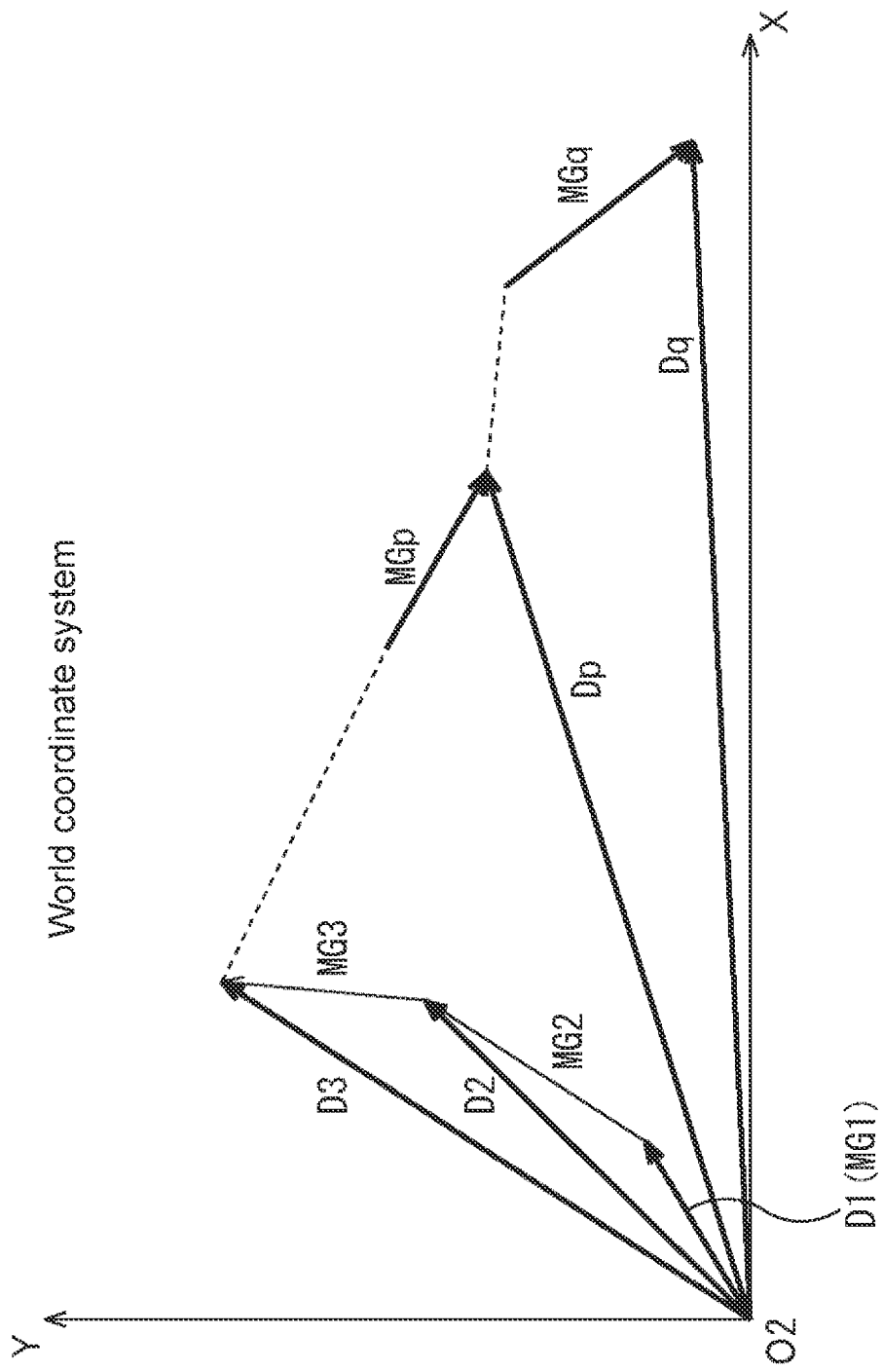
FIG. 5 is a diagram describing contents of processing performed by an integration section.

FIG. 5 is a diagram describing contents of processing performed by the integration section 58. Note that, in the figure, the Z-axis in the world coordinate system that is a direction orthogonal to the surface of the sheet of the figure is omitted, and only the X-axis and the Y-axis in the world coordinate system are illustrated. The world coordinate system is represented by O2-XY. Further, the figure illustrates a case in which the device is limited to being moved in two directions of the X-axis and Y-axis.

The figure illustrates movement vectors MG1, MG2, MG3, . . . , MGp, . . . , MGq (p and q are positive integers and p<q) and displacement vectors D1, D2, D3, . . . , Dp, . . . , Dq (p and q are natural numbers and p<q) in the world coordinate system O2-XY.

The movement vectors MG1, MG2, MG3, . . . , MGp, . . . , MGq are movement vectors MG sequentially supplied from the coordinate converter 56 to the integration section 58 when the displacement vector D is a zero vector, and are in a state of being connected in a chronological order. Note that being connected refers to a state in which an end point of one of the two temporally adjacent movement vectors that is supplied earlier is set to be a start point of the movement vector supplied later.

The displacement vectors D1, D2, D3, . . . , Dp, . . . , Dq are displacement vectors D respectively obtained by the corresponding movement vectors MG1, MG2, MG3, . . . , MGp, . . . , MGq being sequentially added by the integration section 58.

The displacement vector D1 is a displacement vector obtained by adding the movement vector MG1 first supplied by the coordinate converter 56 when the displacement vector D is a zero vector, and is equivalent to the movement vector MG1. An end point of the displacement vector D1 indicates a position to which the device is moved from the origin O2 in accordance with a movement amount and a movement direction that are indicated by the movement vector MG1, and indicates a current relative position of the device with respect to the reference position in the real space. Note that the origin O2 of the world coordinate system is set to be the reference position indicating the position of the device in the real space and in the world coordinate system when the displacement vector D is a zero vector, but the reference position is not necessarily limited thereto.

When the movement vector MG2 is subsequently supplied to the integration section 58, the movement vector MG2 is added to the displacement vector D1 to calculate the displacement vector D2. An end point of the displacement vector D2 indicates a position to which the device is moved from the end point of the displacement vector D1 in accordance with a movement amount and a movement direction that are indicated by the movement vector MG2, and coincides an end point of the movement vector MG2 when the movement vectors MG1 and MG2 are connected, as illustrated in the figure.

As described above, when the movement vector MGp is supplied, the integration section 58 adds the movement vector MGp to the displacement vector D (p−1) to calculate the displacement vector Dp. Here, an end point of the displacement vector Dp indicates a position to which the device is moved from an end point of the displacement vector D (p−1) in accordance with a movement amount and a movement direction that are indicated by the movement vector MGp.

Then, an end point of the displacement vector Dq that is calculated when a newest movement vector MGq is supplied to the integration section 58 indicates a current relative position of the device with respect to the reference position in the real space and in the world coordinate system.

Note that the XYZ component values (DX, DY, DZ) of the displacement vector D in the world coordinate system that are sequentially calculated by the integration section 58 may be stored in a storage (not illustrated) as data that indicates a relative position of the device with respect to a specified reference position in the real space, so that it is possible to, for example, display a trajectory of a relative position of the device with respect to a reference position.

In FIG. 2, the PDR section 60 for obtaining an absolute position calculates a coordinate value of an absolute coordinate system on the basis of the displacement vector D from the integration section 58, the coordinate value of the absolute coordinate system indicating a current position of the device in the real space (a current absolute position).

The absolute coordinate system is a coordinate system in which an arbitrary position in the real space, for example, on the earth is uniquely specified using a coordinate value. For example, a geographic coordinate system in which values of latitude, longitude, and altitude are used as coordinate values corresponds to an absolute coordinate system.

Here, the world coordinate system in the present embodiment is a coordinate system in which, for example, a distance in the three directions of the x-axis, the y-axis, and the z-axis from an origin is represented by a coordinate value. In general, a position in the real space and a coordinate point of the world coordinate system are not associated with each other. Thus, in this case, a coordinate value that indicates a current position of the device in the real space is obtained using the coordinate values (latitude value, lightness value, altitude value) of the geographic coordinate system in which a position in the real space and a coordinate value are associated with each other in advance.

Note that the PDR section 60 for obtaining an absolute position may obtain a current position of the device using a coordinate value of another type of absolute coordinate system such as the geographic coordinate system in which a position in the real space and a coordinate value are associated with each other in advance. or may obtain a current position of the device using a coordinate value of the world coordinate system, with the absolute coordinate system itself being used as the world coordinate system.

Further, when a coordinate value of the absolute coordinate system is obtained as a coordinate value that indicates a current position of the device, as described in the present embodiment, there is no need to use a world coordinate system other than the absolute coordinate system, with the absolute coordinate system itself being used as the world coordinate system. However, in the present embodiment, a coordinate value that indicates a current position of the device is obtained using two coordinate systems that are the world coordinate system and the absolute coordinate system, considering the case in which the coordinate value that indicates a current position of the device is obtained in a coordinate system other than the absolute coordinate system.

First, the PDR section 60 for obtaining an absolute position sets reference positions of the world coordinate system and the geographic coordinate system. The reference position may be set at any timing such as when processing performed by the PDR section 60 for obtaining an absolute position starts. The reference position may be set at a timing at which a when a pedestrian himself/herself gives an instruction to set a reference position in the real space using specified input means when the pedestrian is in a place that is the reference position, or may be set at a timing at which a signal indicating the reference position is given by an external sensor (not illustrated).

Further, a theoretically calculable error occurs in the movement vector M calculated by the movement vector estimator 48, and the error is accumulated in the displacement vector D. Thus, the PDR section 60 for obtaining an absolute position may calculate the error in the displacement vector D, and may set a reference position when the calculated error is not less than a specified threshold in order to reset the displacement vector D, as described later.

From among external positioning data supplied every second by the external sensor 36, the PDR section 60 for obtaining an absolute position acquires external positioning data supplied when the reference positions of the world coordinate system and the geographic coordinate system are set. Note that the PDR section 60 for obtaining an absolute position may make a request that the external sensor 36 supply the external positioning data when it is necessary for the PDR section 60 for obtaining an absolute position.

Then, the PDR section 60 for obtaining an absolute position sets, to be a reference coordinate value SB indicating the reference position of the geographic coordinate system, a coordinate value G (latitude value, longitude value, altitude value) in the geographic coordinate system that is indicated by the acquired external positioning data, and resets the displacement vector D of the integration section 58 to a zero vector. Further, a coordinate value of the world coordinate system that corresponds to the reference coordinate value SB of the geographic coordinate system is set to be a reference coordinate value PB indicating the reference position of the world coordinate system.

Figure 6:
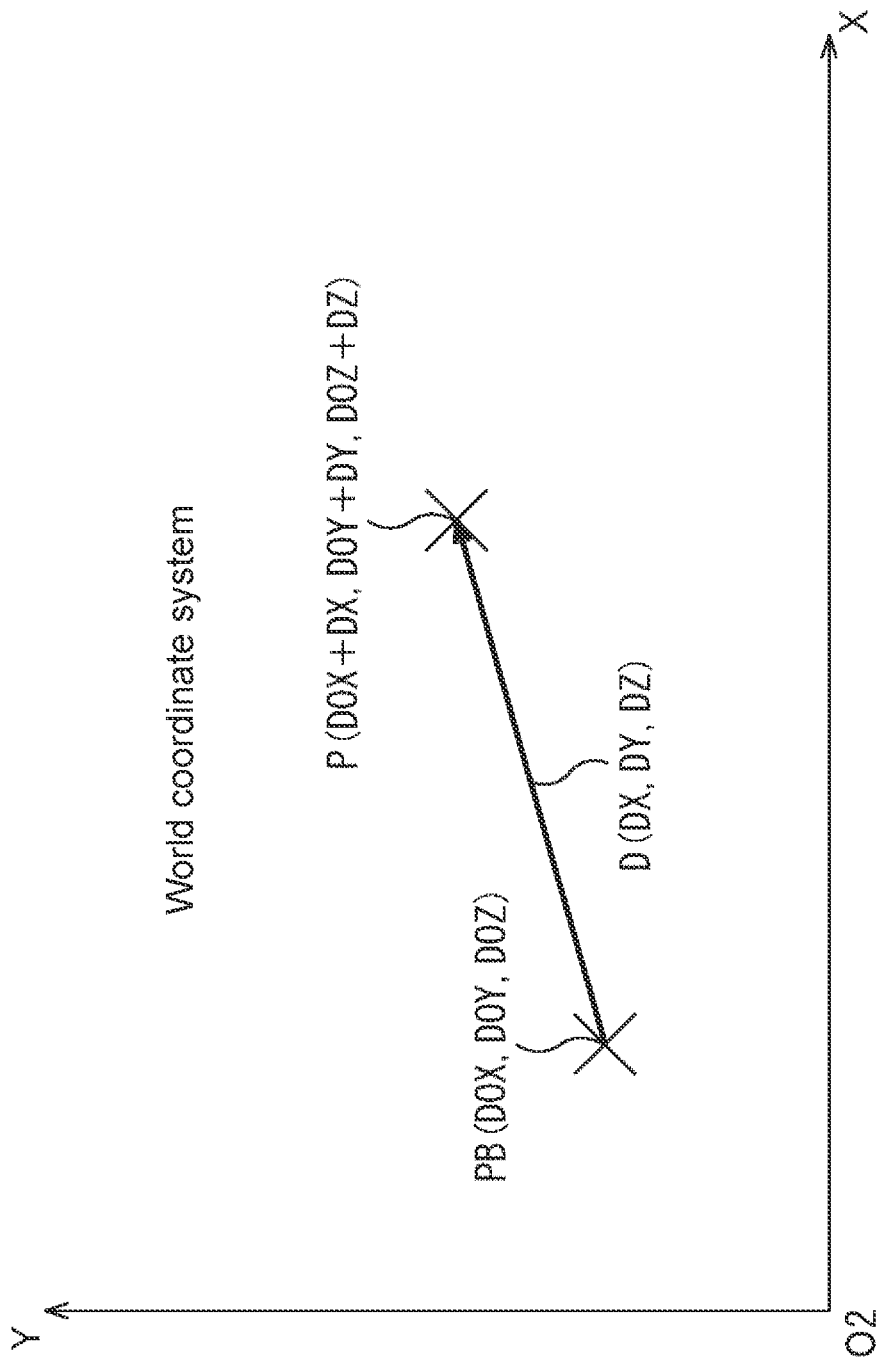
FIG. 6 is a diagram describing contents of processing performed by a PDR section for obtaining an absolute position.

Note that when the reference coordinate value PB is set for the first time, a predetermined coordinate value (for example, an origin) is set to be the reference coordinate value PB of the world coordinate system. FIG. 6 illustrates the reference coordinate value PB (D0X, D0Y, D0Z) set in the world coordinate system O2-XYZ, with the Z-axis being a direction orthogonal to the surface of the sheet of the figure.

The world coordinate system is set such that the vertical direction and the true-north direction in the real space are specified directions with respect to the three directions of the X-axis, Y-axis, and Z-axis. Thus, when the reference coordinate value PB of the world coordinate system and the reference coordinate value SB of the geographic coordinate system are associated with each other as coordinate values that indicate an identical position in the real space, each coordinate value of the world coordinate system and a corresponding one of the coordinate values of the geographic coordinate system are associated with each other, and a position in the real space and a coordinate value of the world coordinate system are associated with each other through a coordinate value of the geographic coordinate system.

Note that, when the geographic coordinate system is not used, a position in the real space and a coordinate value of the world coordinate system are also associated with each other by setting, to be the reference coordinate value PB, a predetermined coordinate value of the world coordinate system when a pedestrian is in a place that is the reference position in the real space.

After the PDR section 60 for obtaining an absolute position sets the reference positions of the world coordinate system and the geographic coordinate system, the PDR section 60 for obtaining an absolute position calculates a coordinate value P (D0X+DX, D0Y+DY, D0Z+DZ) as a coordinate value P that indicates a current position of the device every time the displacement vector D is supplied from the integration section 58, the coordinate value P (D0X+DX, D0Y+DY, D0Z+DZ) being obtained by adding the XYZ component value (DX, DY, DZ) of the displacement vector D to the reference coordinate value PB (D0X, D0Y, D0Z) of the world coordinate system, as illustrated in FIG. 6.

Further, a coordinate value S (latitude value, longitude value, altitude value) of the geographic coordinate system that is associated with the coordinate value P (D0X+DX, D0Y+DY, D0Z+DZ) of the world coordinate system is calculated as a coordinate value S that indicates a current position of the device.

Note that, by converting the displacement vector D into a component value for respective axes of the geographic coordinate system and adding the component value to the reference coordinate value SB of the geographic coordinate system, it is also possible to directly calculate the coordinate value S (latitude value, longitude value, altitude value) of the geographic coordinate system without using the world coordinate system.

Then, the PDR section 60 for obtaining an absolute position sets, to be the coordinate values each indicating a current position of the device, the obtained coordinate value P of the world coordinate system and the obtained coordinate value S of the geographic coordinate system, and sets, to be positioning data indicating a positioning result, the obtained coordinate value P of the world coordinate system and the obtained coordinate value S of the geographic coordinate system.

Further, the PDR section 60 for obtaining an absolute position obtains the positioning data in a sequential manner on the basis of the displacement vector D supplied every second by the integration section 58, and generates trajectory data that indicates a trajectory along which the device has moved in the real space.

The PDR section 60 for obtaining an absolute position supplies the positioning data and the trajectory data that are obtained as described above to at least one of a display section (not illustrated), a storage (not illustrated), or an external apparatus (not illustrated). When the positioning data and the trajectory data are supplied to the display section, any display mode, such as a mode in which a position indicated by the positioning data or the trajectory data is visualized to be displayed at a corresponding position on a map image, may be adopted to perform display.

Figure 7:
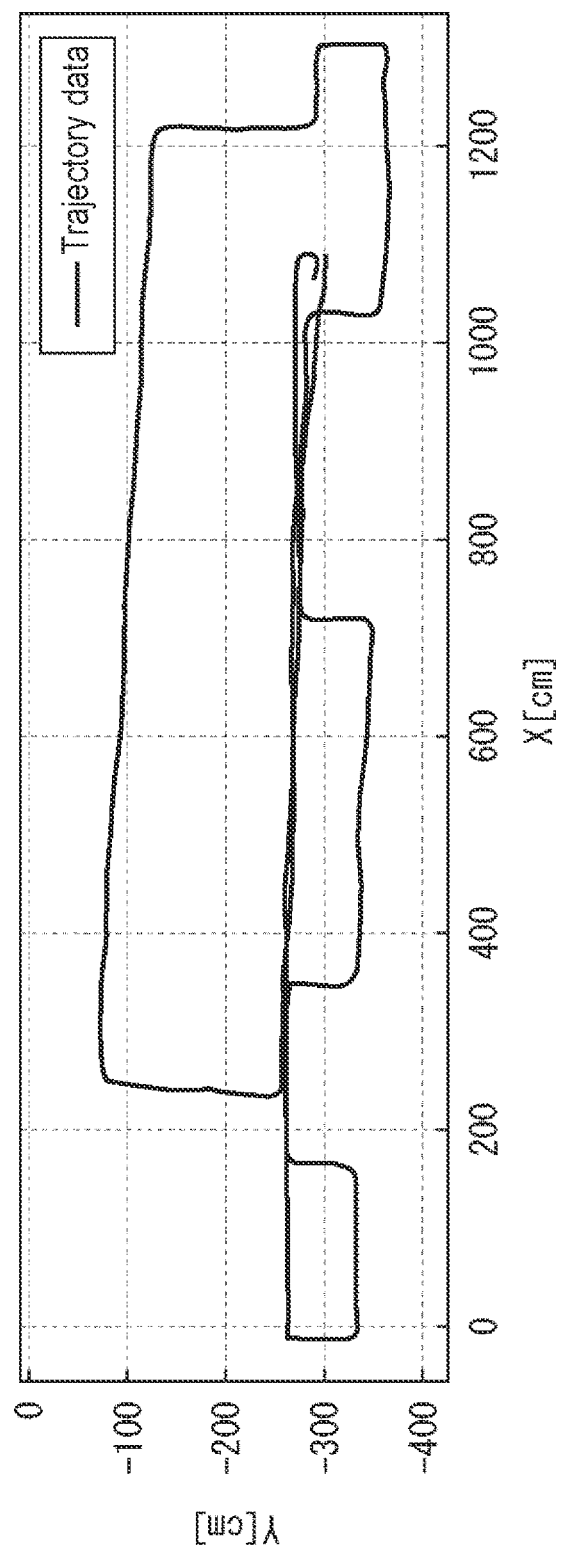
FIG. 7 illustrates an example of displaying trajectory data generated using a coordinate value of a world coordinate system.

FIG. 7 illustrates an example of displaying the trajectory data generated using a coordinate value of the world coordinate system. In FIG. 7, the horizontal axis represents an X coordinate value of the world coordinate system, and the vertical axis represents a Y coordinate value of the world coordinate system. The trajectory data may be visualized to be displayed by connecting, using a line and in the order of passing, coordinate points through which the device passes in an XY coordinate plane that represents the world coordinate system, as illustrated in FIG. 7.

Note that, in the figure, display of trajectory data for the Z-axis direction of the world coordinate system is omitted. However, the trajectory data for the Z-axis direction may also be displayed by displaying an XZ-coordinate plane and an YZ-coordinate plane of the world coordinate system and by displaying trajectory data on each of those coordinate planes. Further, it is also possible to stereoscopically display the X-axis, the Y-axis, and the Z-axis of the world coordinate system and to three-dimensionally display trajectory data in the directions of the X-axis, the Y-axis, and the Z-axis.

Here, the external apparatus is an apparatus such as a computer that is connected to the positioning apparatus 10 using at least one of a wireless connection or a wired connection.

Further, in the storage, data supplied from the PDR section 60 for obtaining an absolute position is stored in a nonvolatile memory, such as a flash memory, into which data can be rewritten.

Furthermore, in the embodiment described above, all of the structural components are integrated through, for example, a support. The structural components do not necessarily have to be integrated, and may be divided into a plurality of portions as long as it is possible to communicate a signal wirelessly or by wire. However, the acceleration sensor 40, the angular velocity sensor 42, and the geomagnetic sensor 45 are held by a measurement subject such as a pedestrian.

<<Procedure of Processing Performed in Present Embodiment illustrated in FIG. 2>>

Figure 8:
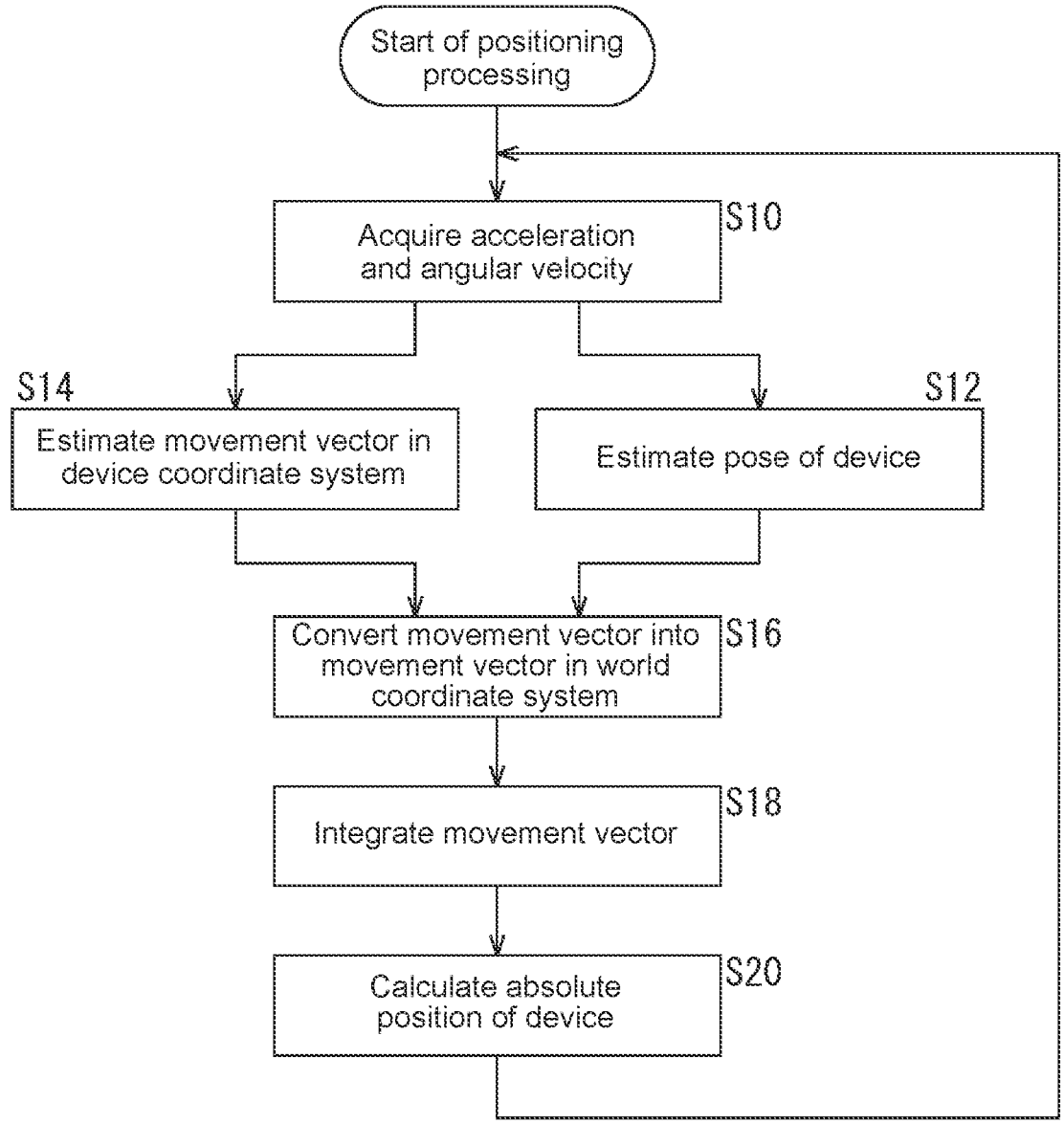
FIG. 8 is a flowchart illustrating an example of processing performed by the positioning apparatus.

FIG. 8 is a flowchart illustrating an example of processing performed by the positioning apparatus 10 illustrated in FIG. 2.

Steps S10 to S20 of FIG. 8 are repeatedly performed by the AHRS 32, the DNN 34, and the sensor combiner 38.

In Step S10, the AHRS 32 and the DNN 34 acquire, from the IMU 30 and as sensor data (Ax, Ay, Az, ωx, ωy, ωz), acceleration data (Ax, Ay, Az) and angular velocity data (ωx, ωy, ωz) that respectively indicate acceleration and an angular velocity that are respectively detected by the acceleration sensor 40 and the angular velocity sensor 42 of the IMU 30. Note that, in Step S10, the AHRS 32 and the DNN 34 acquire the pieces of sensor data (Ax, Ay, Az, ωx, ωy, ωz) for a period of one second, the sensor data (Ax, Ay, Az, ωx, ωy, ωz) being supplied by the IMU 30 every 0.02 seconds.

In Step S12, the AHRS 32 estimates a pose of the device in the real space on the basis of the sensor data (Ax, Ay, Az, ωx, ωy, ωz) acquired in Step S10 and a geomagnetic signal from the geomagnetic sensor 45 included in the AHRS 32. In other words, the AHRS 32 calculates the vertical direction and the true-north direction in the device coordinate system as pose data that indicates a pose of the device.

With respect to the pieces of sensor data (Ax, Ay, Az, ωx, ωy, ωz) for the period of time of one second that are supplied by the IMU 30, the AHRS 32 estimates the pose of the device after being changed for the period of time of one second. Then, by Steps S10 to S20 being repeatedly performed, the AHRS 32 updates the pose data every second, and supplies the updated pose data every second to the coordinate converter 56 of the sensor combiner 38.

In Step S14, the movement vector estimator 48 of the DNN 34 estimates a movement vector M in the device coordinate system on the basis of the sensor data (Ax, Ay, Az, ωx, ωy, ωz) acquired in Step S10. In other words, the movement vector estimator 48 calculates an xyz component value (Mx, My, Mz) of the movement vector M in the device coordinate system, the xyz component value (Mx, My, Mz) indicating a movement amount and a movement direction of movement that is estimated to have been performed by the device for the period of time of one second, which is a period of time for estimating a movement vector.

In the estimation of a movement vector, a trained machine learning model (a machine learning model that has performed learning) that is generated by a model generator 90 and a data collector 92 illustrated in FIG. 9 that will be described later, is used.

By Steps S10 to S20 being repeatedly performed, the movement vector estimator 48 estimates the movement vector M every second, and supplies the estimated movement vector M every second to the coordinate converter 56 of the sensor combiner 38.

In Step S16, the coordinate converter 56 of the sensor combiner 38 converts the movement vector M in the device coordinate system into a movement vector MG in the world coordinate system on the basis of the pose data supplied by the AHRS 32 in Step S12 and the movement vector M supplied by the movement vector estimator 48 in Step S14.

In other words, the coordinate converter 56 converts the xyz component value (Mx, My, Mz) of the movement vector M in the device coordinate system into an XYZ component value (MX, MY, MZ) of the movement vector MG in the world coordinate system on the basis of the pose of the device.

By Steps S10 to S20 being repeatedly performed, the coordinate converter 56 converts the movement vector M in the device coordinate system supplied every 1 second from the movement vector estimator 48 into the movement vector MG in the world coordinate system, and supplies, every second, the movement vector MG obtained by the conversion to the integration section 58 of the sensor combiner 38.

In Step S18, the integration section 58 of the sensor combiner 38 adds, to a displacement vector D, the movement vector MG supplied by the coordinate converter 56 in Step S16 to update the displacement vector D.

In other words, the integration section 58 adds the XYZ component values (MX, MY, MZ) of the movement vector MG supplied by the coordinate converter 56 to an XYZ component value (DX, DY, DZ) of the displacement vector D, and updates an XYZ component values (DX+MX, DY+MY, DZ+MZ) obtained by the addition as the XYZ component value (DX, DY, DZ) of the displacement vector D. This results in calculating the displacement vector D indicating a displacement amount and a displacement direction of displacement of the device to a current position from a reference position in the world coordinate system (a relative position of the device with respect to the reference position).

By Steps S10 to S20 being repeatedly performed, the integration section 58 updates the displacement vector D every second in response to the movement vector MG supplied every second by the integration section 58, and supplies the updated displacement vector D every second to the PDR section 60 for obtaining an absolute position.

In Step S20, the PDR section 60 for obtaining an absolute position of the sensor combiner 38 calculates a coordinate value that indicates a current position of the device in the real space (a current absolute position) on the basis of the displacement vector D supplied by the integration section 58.

In other words, the PDR section 60 for obtaining an absolute position adds, to a reference coordinate value PB (D0X, D0Y, D0Z) of the world coordinate system, the XYZ component value (DX, DY, DZ) of the displacement vector D that is supplied by the integration section 58, and calculates a coordinate value P (D0X+DX, D0Y+DY, D0Z+DZ) that indicates a current position of the device.

Further, the PDR section 60 for obtaining an absolute position calculates, as a coordinate value S indicating a current position of the device, a coordinate value S (latitude value, longitude value, altitude value) of the geographic coordinate system that is associated with the coordinate value P (D0X+DX, D0Y+DY, D0Z+DZ) of the world coordinate system.

Note that the PDR section 60 for obtaining an absolute position resets the displacement vector D of the integration section 58 to a zero vector upon starting performing processing, and sets, to be a reference coordinate value SB indicating a reference position of the geographic coordinate system, a coordinate value G (latitude value, longitude value, altitude value) in the geographic coordinate system that is indicated by external positioning data acquired from the external sensor 36 upon the resetting.

Further, at the same time, the PDR section 60 for obtaining an absolute position sets, to be a reference coordinate value PB indicating a reference position of the world coordinate system, a coordinate value of the world coordinate system that corresponds to the reference coordinate value SB of the geographic coordinate system. When the PDR section 60 for obtaining an absolute position sets the reference coordinate value PB for the first time, the PDR section 60 for obtaining an absolute position sets a predetermined coordinate value (for example, an origin) to be the reference coordinate value PB of the world coordinate system. Accordingly, the PDR section 60 for obtaining an absolute position associates a coordinate value of the world coordinate system with a coordinate value of the geographic coordinate system.

Then, by Steps S10 to S20 being repeatedly performed, the PDR section 60 for obtaining an absolute position calculates a coordinate value P of the world coordinate system and a coordinate value S of the geographic coordinate system every second as a coordinate value indicating a current position of the device in the real space with respect to the displacement vector D supplied every second by the integration section 58, and uses the calculated coordinate value P of the world coordinate system and the calculated coordinate value S of the geographic coordinate system as positioning data that is a result of positioning performed by the positioning apparatus 10.

Further, by Steps S10 to S20 being repeatedly performed, the PDR section 60 for obtaining an absolute position stores the positioning data obtained every second to generate trajectory data indicating trajectory of positions through which the device has passed.

<<Generation of Machine Learning Model>>

Next, generation (training) of a machine learning model is described. The machine learning model is generated (trained) using the model generator 90 and the data collector 92, the model generator 90 and the data collector 92 being operated by a program included in software and installed in, for example, a general-purpose computer, as illustrated in FIG. 9.

Figure 9:
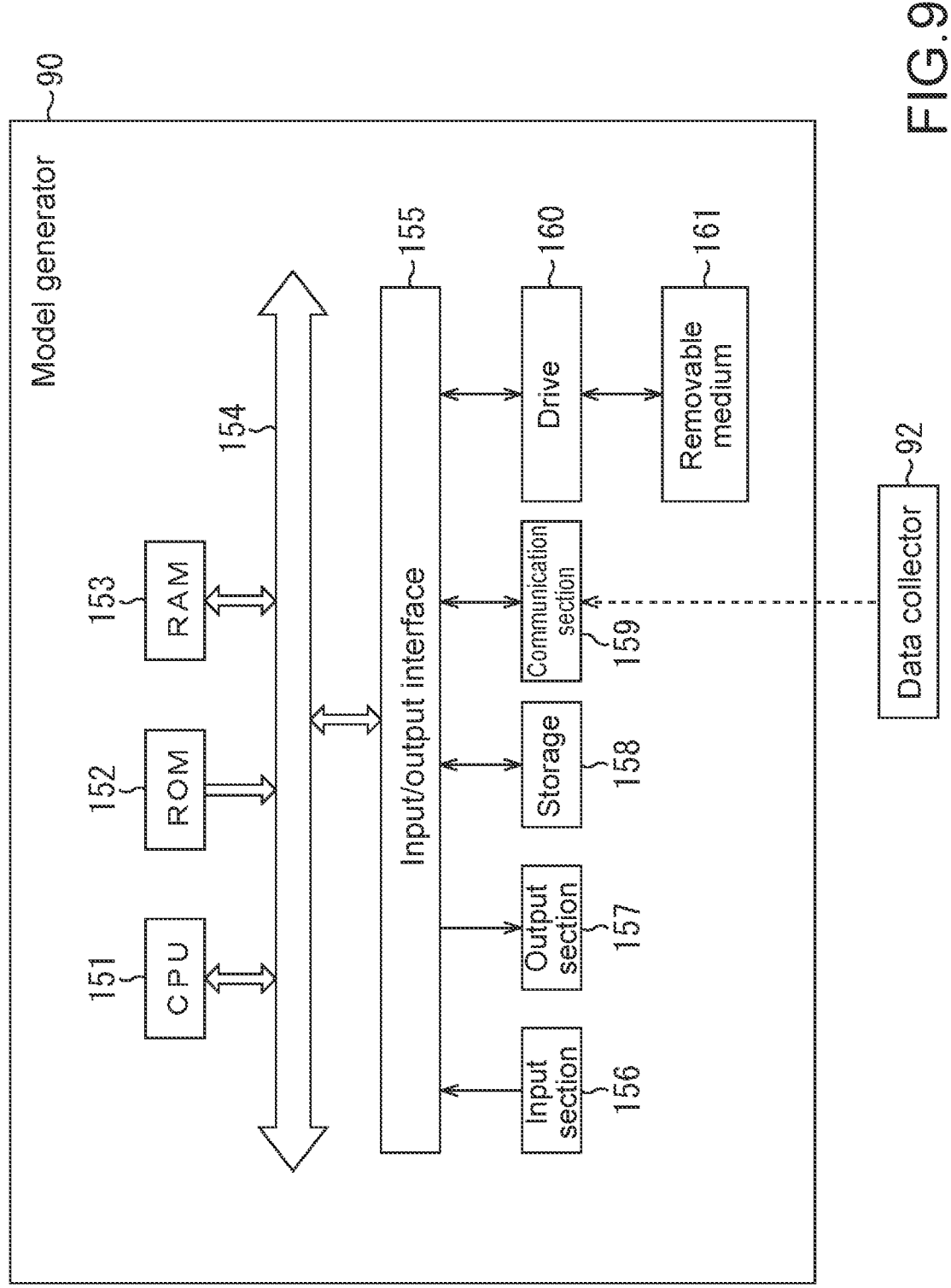
FIG. 9 is a block diagram of a configuration example of a model generator and a data collector that are used to generate a machine learning model.

FIG. 9 is a block diagram of a configuration example of the model generator 90 and the data collector 92, the model generator 90 performing a process of generating a machine learning model using a program of software that is installed in a general-purpose computer, the data collector 92 collecting walking data.

In the model generator 90, a central processing unit (CPU) 151, a read only memory (ROM) 152, and a random access memory (RAM) 153 are connected to one another through a bus 154.

Further, an input/output interface 155 is connected to the bus 154. An input section 156, an output section 157, a storage 158, a communication section 159, and a drive 160 are connected to the input/output interface 155.

The input section 156 includes, for example, a keyboard, a mouse, and a microphone. The output section 157 includes, for example, a display and a speaker. The storage 158 includes, for example, a hard disk and a nonvolatile memory. The communication section 159 includes, for example, a network interface. The drive 160 drives a removable medium 161 such as a magnetic disk, an optical disk, a magneto-optical disk, or a semiconductor memory.

In the model generator 90 having the configuration described above, for example, the CPU 151 performs processing of generating a machine learning model by the CPU 151 loading a program stored in the storage 158 into the RAM 153 and executing the program via the input/output interface 1555 and the bus 154.

For example, the data collector 92 has a similar configuration to the configuration of the positioning apparatus 10 in the embodiment described above, and is communicatively connected to the communication section 159 of the model generator 90.

Note that the following description is made, with a component of the data collector 92 that is the same as or similar to the component of the positioning apparatus 10 being denoted by the same reference numeral as the positioning apparatus 10. However, the data collector 92 does not have to include the movement vector estimator 48. It is sufficient if the data collector 92 includes the IMU 30 and the AHRS 32, which are similar to those of the positioning apparatus 10, and is capable of obtaining acceleration data, angular velocity data, and pose data that are output from the IMU 30 and the AHRS 32.

Further, the pose data is data used to obtain an xyz-component value of a movement vector in the device coordinate system when training data for a machine learning model is generated, the pose data being a correct answer used as output data. However, the pose data does not necessarily have to be measured by the AHRS 32. For example, when a pose of the data collector 92 in the real space is substantially constant at the time of collecting walking data and when it is possible to maintain the pose, there is also no need for measurement of the pose data that is performed by the AHRS 32, and thus there is also no need for the AHRS 32.

Further, the data collector 92 includes positioning means using a signal (such as a beacon signal) from a device that performs wireless communication, and a three-dimensional position of the data collector 92 is measured by the positioning means. However, the positioning means is not limited thereto.

Figure 10:
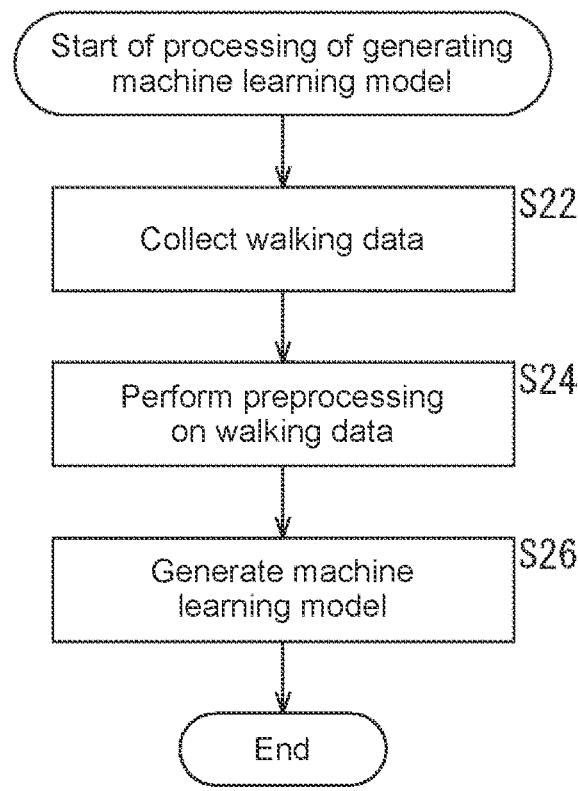
FIG. 10 is a flowchart illustrating an example of processing performed by the model generator and the data collector.

FIG. 10 is a flowchart illustrating an example of processing of generating a machine learning model that is performed by the model generator 90 and the data collector 92.

In S22 of FIG. 10, the model generator 90 (the CPU 151) collects walking data through the data collector 92. The walking data is actual measurement data used to generate training data that is used to train a machine learning model (to cause a machine learning model to perform learning), and the training data generated from the walking data is referred to as walking data for learning.

When a creator of a machine learning model collects walking data using the data collector 92, the creator of a machine learning model causes the data collector 92 to start measurement in a state in which a pedestrian is holding the data collector 92 (processing of acquiring data). Then, the pedestrian walks (including running) along a specified movement path. However, the movement path may be discretionarily determined by a pedestrian.

After the measurement is started, the data collector 92 acquires, as walking data, sensor data (Ax, Ay, Az, ωx, ωy, ωz) that is made up of acceleration data (Ax, Ay, Az) and angular velocity data (ωx, ωy, ωz) that are output by the IMU 30 at specified time intervals. The sensor data corresponds to acceleration data and angular velocity data that are respectively obtained by the acceleration sensor 40 and the angular velocity sensor 42 of the positioning apparatus 10 (the device) when the pedestrian is holding the positioning apparatus 10.

Further, the data collector 92 acquires, as walking data, pose data that is output by the AHRS 32 at specified time intervals, and position data that indicates a three-dimensional position of the data collector 92 and is output by positioning means at specified time intervals.

Furthermore, the data collector 92 acquires, as walking data, time data that indicates time that has elapsed since the start of measurement and indicates times at which the sensor data (Ax, Ay, Az, ωx, ωy, ωz), the pose data, and the position data are respectively output.

The walking data acquired by the data collector 92 is temporarily stored in the data collector 92, and is transferred to the storage 158 through the communication section 159 of the modeler 90 after the measurement is terminated.

The collection of walking data described above is performed under various circumstances while changing a factor related to a motion of a pedestrian, a factor related to a pedestrian (individual), and a factor related to a walking environment.

Examples of the factor related to a motion of a pedestrian include looking away while walking, STOP & GO in which a movement and a stop are repeated, and walking sideways.

Further, examples of the factor related to a pedestrian include an individual difference in how to walk (a pedestrian himself/herself), a position at which the data collector 92 is held (such as foot, waist, hand, arm, and head), a state in which the data collector 92 is held (such as worn on the body, attached to clothes, gripped by hand, and put in a pocket or a bag), a gender of a pedestrian, and shoes of a pedestrian (such as sneakers, leather shoes, and high heels).

Examples of the factor related to an environment include a state of a walking place (such as stairs and a slope).

The waling data is collected by changing a combination of these factors. By training a machine model using walking data in which such various situations are considered, an estimation of a movement vector using a machine learning model is performed with a high degree of accuracy with respect to various situations.

In Step S24 of FIG. 10, the modeler 90 (the CPU 151) performs preprocessing on the walking data collected in Step S22 to generate walking data for learning that is training data.

Here, the walking data for learning that is training data used to train a machine learning model includes input data input from a data input section of the machine learning model upon training, and output data that is a correct answer for the input data. The input data is sensor data (Ax, Ay, Az, ωx, ωy, ωz) that includes acceleration data (Ax, Ay, Az) and angular velocity data (ωx, ωy, ωz), and the output data is an xyz component value (Mx, My, Mz) of a movement vector M in the device coordinate system that is a correct answer for the input data.

With respect to a large number of pieces of walking data acquired under various circumstances in Step S22, the preprocessing on the walking data is similarly performed for each of the pieces of walking data. However, the description is made below focused on a single piece of walking data.

First, the model generator 90 (the CPU 151) may generate walking data including acceleration data from which the gravity has been separated. In other words, on the basis of the sensor data (Ax, Ay, Az, ωX, ωy, ωz) of the model generator 90 (the CPU 151), an xyz-axis component value of gravitational acceleration that is included in the acceleration data (Ax, Ay, Az) is obtained. When the xyz-axis component value of the gravitational acceleration is represented using gravitational acceleration data (Gx, Gy, Gz), the model generator 90 (the CPU 151) obtains gravity-removal acceleration (Ax-Gx, Ay-Gy, Az-Gz) by subtracting the gravitational acceleration data (Gx, Gy, Gz) from the acceleration data (Ax, Ay, Az). Accordingly, the model generator 90 (the CPU 151) separates the acceleration data (Ax, Ay, Az) into the gravity-removal acceleration (Ax-Gx, Ay-Gy, Az-Gz) and the gravitational acceleration data (Gx, Gy, Gz). Then, the model generator 90 (the CPU 151) may generate walking data less dependent on the pose of the device using nine-axis data (Ax-Gx, Ay-Gy, Az-Gz, Gx, Gy, Gz, ωx, ωy, ωz) as the sensor data (Ax, Ay, Az, ωx, ωy, ωz). However, it is assumed that, in the following description of the preprocessing performed on walking data, the model generator 90 (the CPU 151) does not generate walking data including acceleration data from which the gravity has been separated.

On the basis of the symmetry of a shape (an outer shape) of the positioning apparatus 10, the model generator 90 (the CPU 151) generates, from a pose (referred to as an original pose) upon collecting walking data, walking data in a pose (referred to as a symmetrical pose) in which the outer shape of the positioning apparatus 10 substantially coincides the outer shape of the positioning apparatus 10 in the original pose.

In other words, a pose (the symmetrical pose) in which the outer shape of the positioning apparatus 10 substantially coincides the outer shape of the positioning apparatus 10 in another pose (the original pose) that is expected to be a pose of the positioning apparatus 10 in a state of being held by a pedestrian, is also a pose of the positioning apparatus 10 in the state of being held by the pedestrian.

For example, when the outer shape of the positioning apparatus 10 has symmetry with respect to a rotation of 180 degrees about the z-axis, as illustrated in FIG. 3, a pose of the positioning apparatus 10 rotated 180 degrees about the z-axis from the original pose is a symmetrical pose in which the outer shape of the positioning apparatus 10 substantially coincides the outer shape of the positioning apparatus 10 in the original pose, and can be expected to be a pose of the positioning apparatus 10 in a state of being held by a pedestrian. In this case, orientations of the x-axis and the y-axis are inverted due to the rotation of 180 degrees about the z-axis. Thus, sensor data (-Ax, -Ay, Az, -ωx, -ωy, ωz) in which switching between positive and negative is performed with respect to the x component values and the y component values and the z component values of the sensor data (Ax, Ay, Az, ωx, ωy, ωz) in the original pose remain unchanged, is sensor data in the symmetrical pose.

As described above, on the basis of a relationship between the x-axis, the y-axis, and the z-axis of the original pose, and the x-axis, the y-axis, and the z-axis of the symmetrical pose, the model generator 90 (the CPU 151) calculates pieces of the walking data in all of the symmetrical poses in which the outer shape of the positioning apparatus 10 substantially coincides the outer shape of the positioning apparatus 10 in the original pose upon acquiring walk data. This results in obtaining, without actual measurement, walking data when a pose of the device is the symmetrical pose that is different from the original pose, and thus in easily expanding walking data.

Note that, when the model generator 90 (the CPU 151) generates walking data in a symmetrical pose from walking data in an original pose, the model generator 90 (the CPU 151) changes pose data included in the walking data in the original pose to pose data in the symmetrical pose, and sets the pose data in the symmetrical pose to be pose data included in the walking data in the symmetrical pose.

Further, the model generator 90 (the CPU 151) may generate walking data in any pose from walking data in an original pose.

Furthermore, the model generator 90 (the CPU 151) generates walking data obtained by adding a signal due to random micro-rotations to walking data acquired in Step S20 and to walking data generated by performing the pre-processing.

In other words, the model generator 90 (the CPU 151) adds, as a value of a change in pose, a randomly generated infinitesimal value to angular velocity data (ωx, ωy, ωz) of walking data, and generates new walking data obtained by processing the angular velocity data (ωx, ωy, ωz).

Note that the model generator 90 (the CPU 151) may add, as a value of a change in pose, a randomly generated infinitesimal value to acceleration data (Ax, Ay, Az) of the walking data, and generates new walking data obtained by processing the acceleration data (Ax, Ay, Az).

Next, the model generator 90 (the CPU 151) refers to time data to extract sensor data (Ax, Ay, Az, ωx, ωy, ωz) from the walking data obtained as described above, the sensor data (Ax, Ay, Az, ωx, ωy, ωz) being obtained for a certain period of time of a desired time and being obtained for one second that is a period of time for estimating a movement vector.

Next, from among the pose data obtained by the data collector 92, the model generator 90 (the CPU 151) extracts one of the pieces of pose data obtained during a period of time in which the sensor data (Ax, Ay, Az, ωx, ωy, ωz) has been extracted. Further, on the basis of position data and the time data that are included in the walking data, the model generator 90 (the CPU 151) grasps a movement amount and a movement direction of movement performed by the data collector 92 in the real space during the period of time in which the sensor data (Ax, Ay, Az, ωx, ωy, ωz) has been extracted.

Then, the model generator 90 (the CPU 151) calculates an xyz component value (Mx, My, Mz) of the movement vector M in the device coordinate system from the extracted pose data and from the grasped movement amount and movement direction.

Consequently, the model generator 90 (the CPU 151) generates walking data for learning (Ax, Ay, Ay, ωx, ωy, Mz: Mx, My, Mz) that includes the sensor data (Ax, Ay, Az, ωy, ωz) that is input data, and the xyz component value (Mx, My, Mz) of the movement vector M in the device coordinate system, the xyz component value (Mx, My, Mz) being output data that is a correct answer for the input data.

Further, when pieces of walking data for a plurality of different periods of time (a plurality of different time ranges) are extracted from walking data obtained with a single measurement (processing of acquiring data) performed using the data collector 92, and walking data for learning (Ax, Ay, Az, ωx, ωy, ωz: Mx, My, Mz) is generated, this results in being able to obtain a plurality of walking data for learning for the single measurement.

In Step S26 of FIG. 10, the model generator 90 (the CPU 151) generates (trains) a machine learning model using the walking data for learning generated in Step S24.

For example, the machine learning model has a structure of a deep neural network (DNN) that is a type of neural network (NN). The deep neural network includes an input layer, a plurality of hidden layers, and an output layer, and values input from respective nodes of the input layer are propagated to respective nodes of the output layer through respective nodes of the hidden layer, although a detailed description is omitted since the deep neural network is well known. Further, in each node of the hidden layer and each node of the output layer, an operation using a parameter such as weight and bias, or an activation function is performed on an input value from each node to calculate an output value.

With respect to the machine learning model of the present embodiment, sensor data (Ax, Ay, Az, ωx, ωy, ωz) is input from a data input section that is directly connected to a node of an input layer or indirectly connected to the node of the input layer through, for example, a memory, and an xyz component value (Mx, My, Mz) of an estimated movement vector M is output from a data output section that is directly or indirectly connected to an output layer.

(Input/Output Mode of Machine Learning Model)

Here, with respect to input of the sensor data (Ax, Ay, Az, ωx, ωy, ωz), a first input mode or a second input mode indicated below may be applied to the machine learning model.

Figure 11:
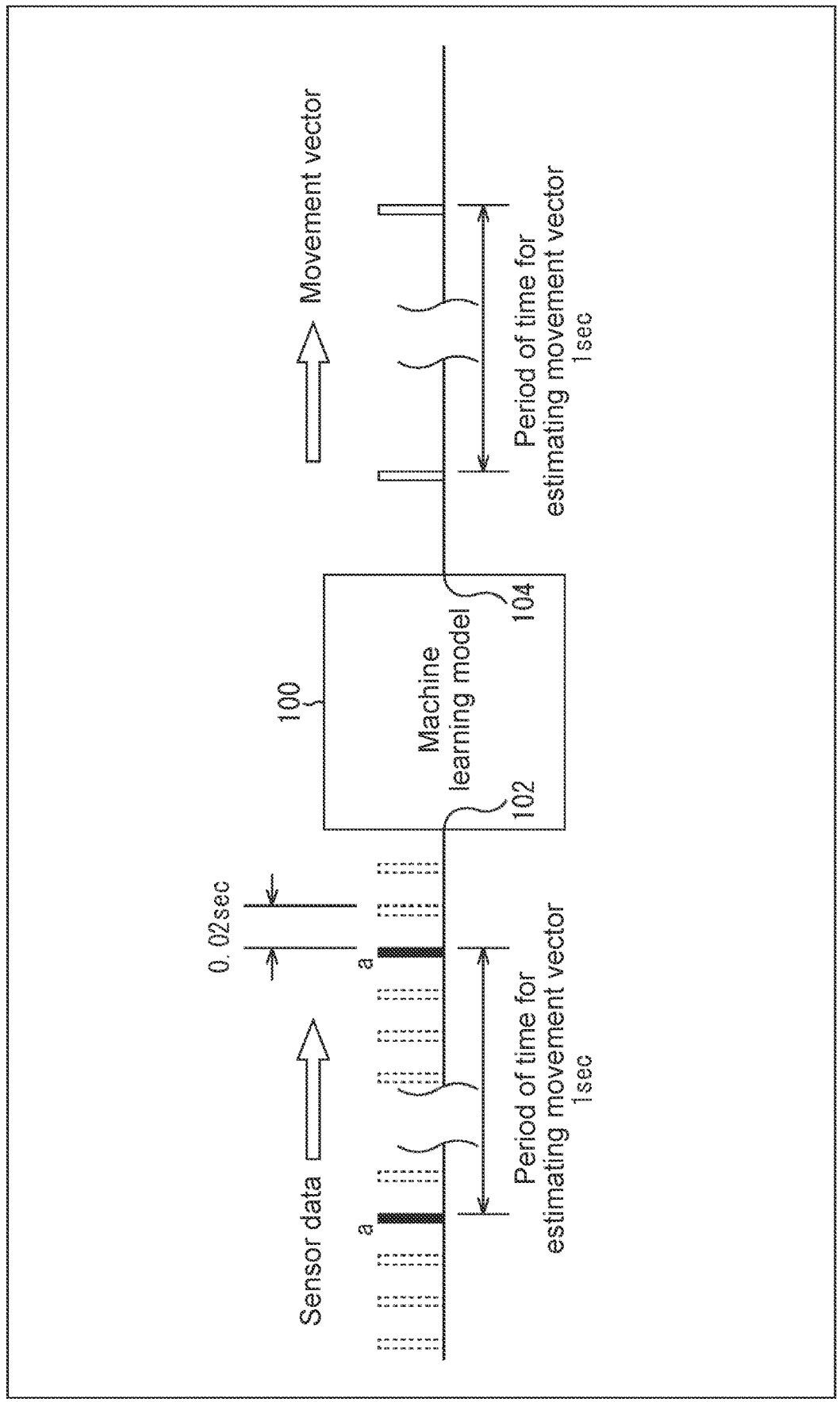
FIG. 11 is a diagram describing an input/output mode of the machine learning model.

As illustrated in FIG. 11, in a machine learning model 100 of the first input mode, one of the pieces of sensor data (data a in the figure) that are (50) pieces of sensor data for one second that is a period of time for estimating a movement vector, is input from a data input section 102 as the input data, the piece of sensor data being supplied by the IMU 30 every 0.02 seconds (an output interval of output performed by the IMU 30).

Figure 12:
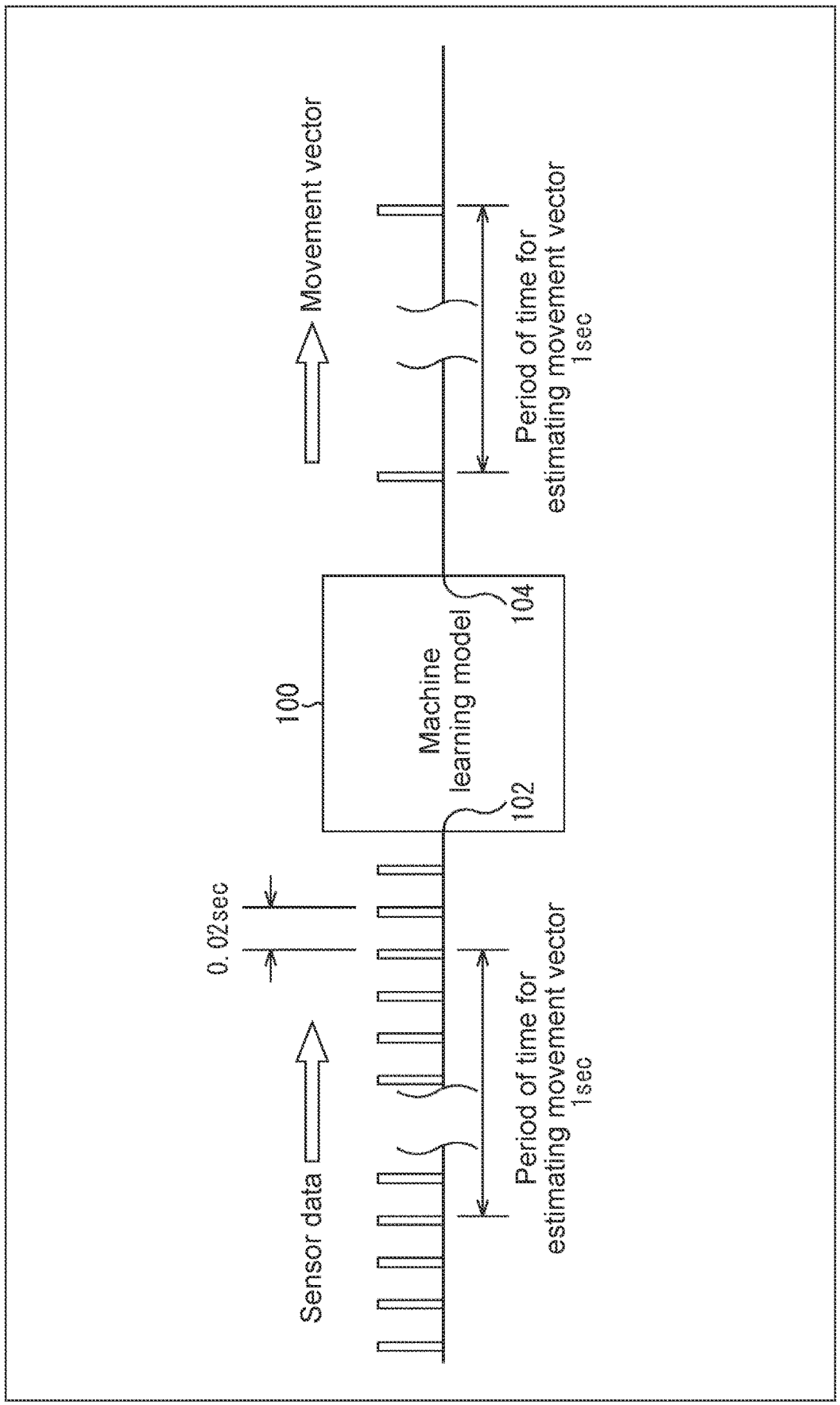
FIG. 12 is a diagram describing an input/output mode of the machine learning model.
Figure 13:
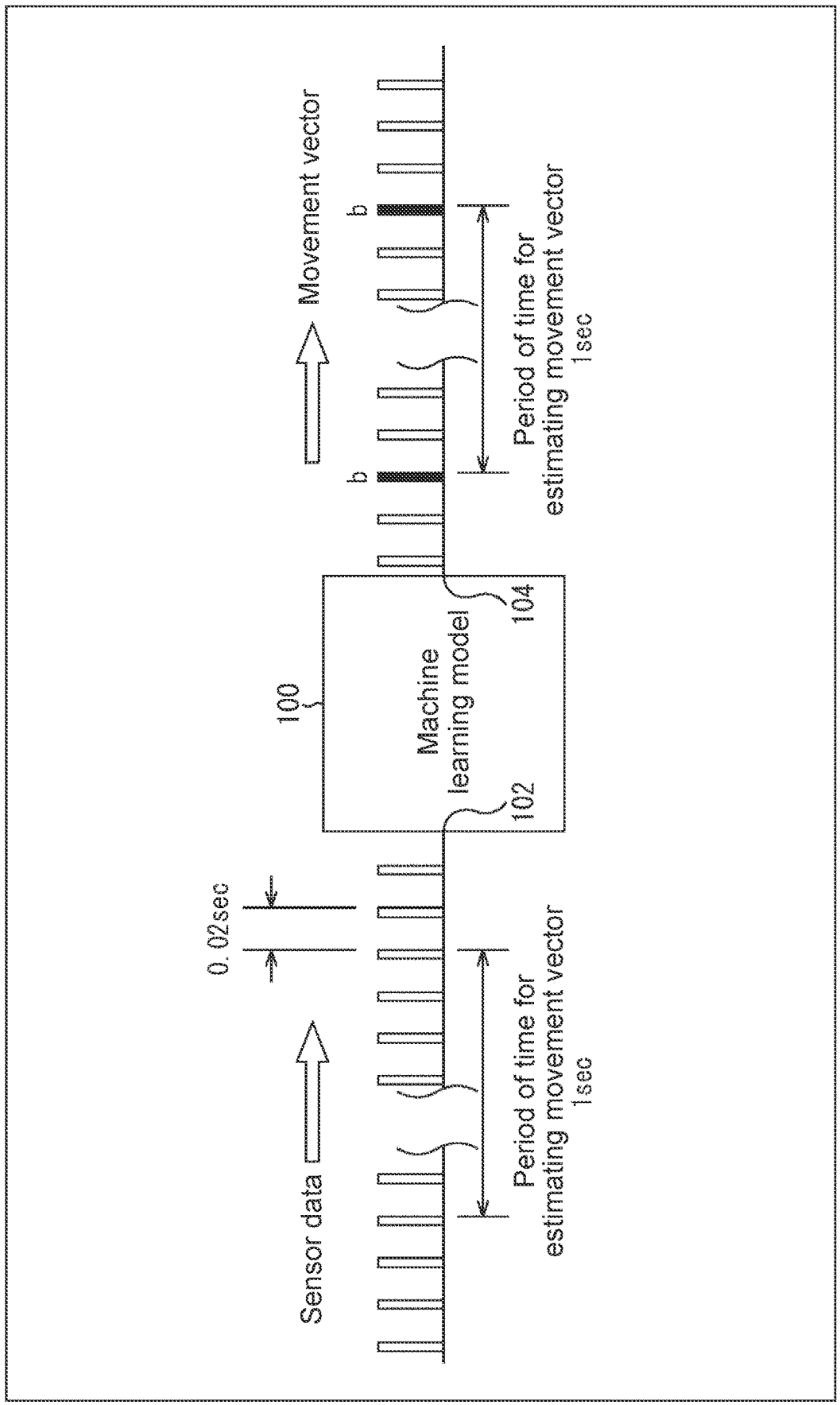
FIG. 13 is a diagram describing the input/output mode of the machine learning model.

As illustrated in FIGS. 12 and 13, in the machine learning model 100 of the second input mode, the (50) pieces of sensor data for one second that is a period of time for estimating a movement vector are sequentially input from the data input section 102 as input data in chronological order, the piece of sensor data being input every 0.02 seconds of an input interval, the piece of sensor data being supplied by the IMU 30 every 0.02 seconds (the output interval of output performed by the IMU 30). However, the input interval at which the input data is input to the machine learning model 100 does not have to be the same as the output interval of output performed by the IMU 30. A mode in which the sensor data acquired from the IMU 30 is reduced so that the input interval is an integral multiple of the output interval of output performed by the IMU 30 and is less than ½ of the period of time for estimating a movement vector, also corresponds to the second input mode.

Further, in the present embodiment, the movement vector M is estimated on the basis of the sensor data input from the data input section 102 for the period of time for estimating a movement vector. However, the movement vector M may be estimated on the basis of the sensor data input from the data input section 102 for a period of time that is different in length of time from the period of time for estimating a movement vector.

On the other hand, with respect to output of the movement vector M, a first output mode or a second output mode indicated below may be applied to the machine learning model 100.

As illustrated in FIGS. 11 and 12, when the first input mode or the second input mode is applied, the machine learning model 100 of the first output mode estimates the movement vector M indicating a movement of the device for one second that is the period of time for estimating a movement vector, on the basis of the sensor data input from the data input section 102 for the period of time for estimating a movement vector, and outputs the estimated movement vector M for each second from a data output section 104, the one second being the period of time for estimating a movement vector.

As illustrated in FIG. 13, when the second input mode is applied, the machine learning model 100 of the second output mode estimates the movement vector M indicating a movement of the device for one second that is the period of time for estimating a movement vector, the estimation being performed every 0.02 seconds of an input interval at which the sensor data is input from the data input section 102, and outputs the estimated movement vector M from the data output section 104. At this point, the movement vector is estimated on the basis of the time-series sensor data sequentially input to the data input section 102 before the period of time for estimating a movement vector. Then, from among the movement vectors M each output in synchronization with the input interval at which the sensor data is input, only the movement vector M (a movement vector b in the figure) output every second is supplied to the sensor combiner 38, the one second being the period of time for estimating a movement vector.

The model generator 90 (the CPU 151) trains the machine learning model 100 using, as training data sets, a large number of sets of walking data for learning that is generated in S24 of FIG. 10.

The training is performed by the model generator 90 (the CPU 151) using a well-known approach called, for example, gradient descent or back propagation. In principle, parameters (such as weight and bias) that are included in a machine learning model are corrected using a large number of walking data for learning that is included in a set of walking data for learning, such that an error between output data calculated by inputting, to the machine learning model 100, pieces of input data with respect to the large number of walking data for learning, and output data of a correct answer with respect to the large number of walking data for learning is small. This results in calculating an optimal parameter.

However, the training method is not limited to the gradient descent and the back propagation. Further, a well-known training method is also used that includes dividing the set of walking data for learning into a set of training data and a set of test data, and verifying a result of the training using the set of test data. However, a detailed description thereof is omitted as appropriate.

When the trained machine learning model that is trained by the model generator 90 and of which a parameter is optimized, is generated, a program that performs arithmetic processing using the trained machine learning model is incorporated into the DNN 34 of the positioning apparatus 10, and the arithmetic processing using the machine learning model is performed by the movement vector estimator 48.

Note that the machine learning model is not limited to the deep neural network having the structure described above. A deep neural network having another structure or various neural networks (such as a convolutional neural network (CNN) and a recurrent neural network (RNN)) can be adopted. Further, Iterative Dichotomiser 3 (ID3), decision tree learning, association rule learning, genetic programming (GP), inductive logic programming (ILP), a fuzzy algorithm, an evolutionary algorithm, reinforcement learning, a support vector machine (SVM), clustering, a Bayesian network, and the like are well-known as algorithms for machine learning other than the neural network. However, any algorithm may be applied to the machine learning model according to the present technology as long as it is included in the algorithms for machine learning described above.

<<Effects>>

Effects provided by the positioning apparatus 10 are described.

<Comparison with Comparative Apparatus>

Figure 14:
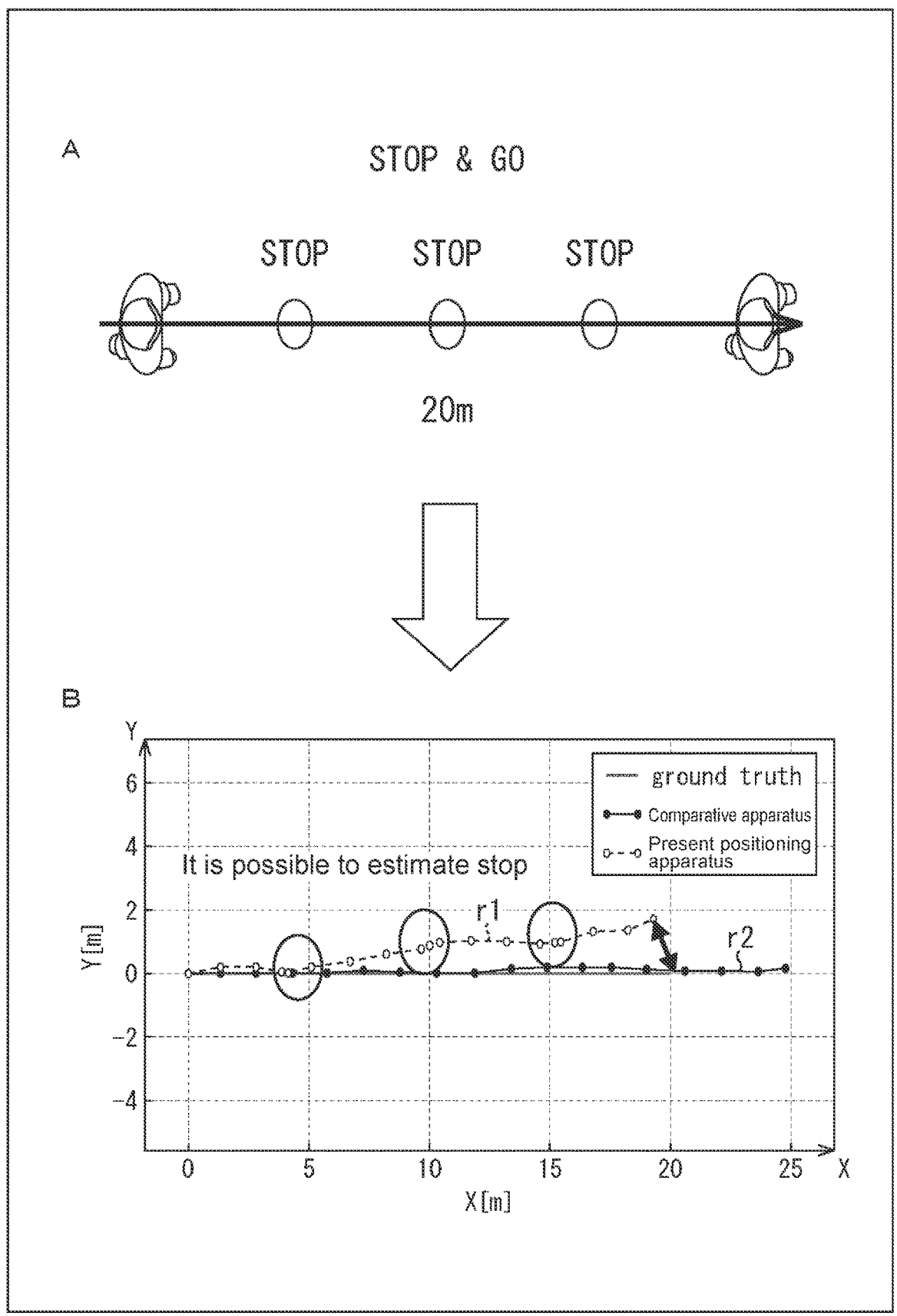
FIG. 14 illustrates an evaluation of an error in positioning data between the positioning apparatus according to the present embodiment to which the present technology is applied, and a comparative apparatus.
Figure 15:
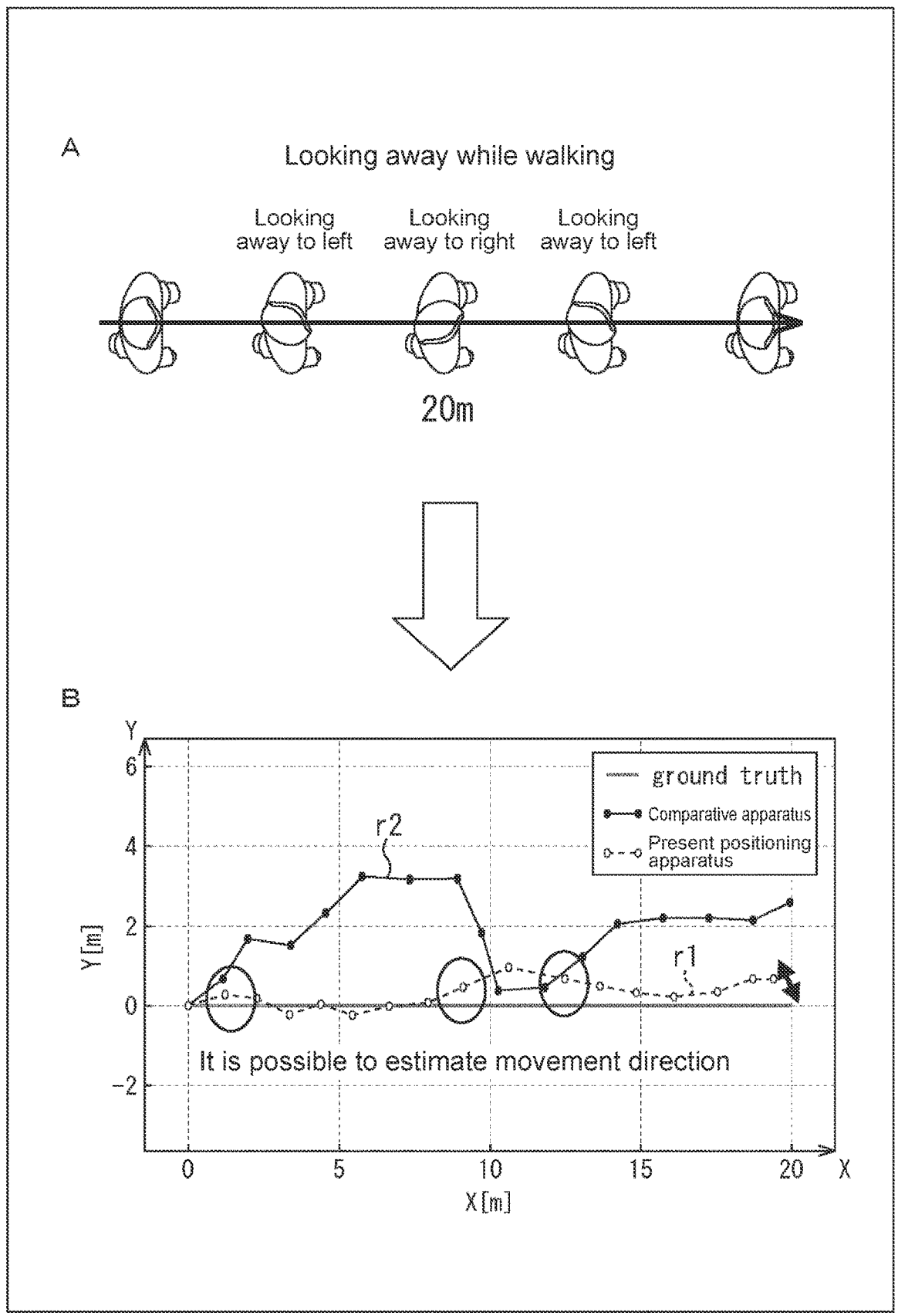
FIG. 15 illustrates an evaluation of an error in positioning data between the positioning apparatus according to the present embodiment to which the present technology is applied, and the comparative apparatus.

FIGS. 14 and 15 illustrate evaluations of an error in positioning data between the positioning apparatus 10 according to the present embodiment and a dead reckoning apparatus used for comparison (hereinafter referred to as a comparative apparatus).

The comparative apparatus does not include the movement vector estimator 48 of the present embodiment, and detects the number of steps of a pedestrian and a pose of the device on the basis of acceleration and an angular velocity that are respectively obtained from the acceleration sensor and the angular velocity sensor. Then, the comparative apparatus estimates a movement amount on the basis of the detected number of steps and a predetermined movement distance per step. Further, the comparative apparatus detects a movement direction on the basis of the estimated pose of the device, as in the case of the positioning apparatus 10 according to the present embodiment.

FIG. 14 is a diagram in which a comparison and an evaluation are performed with respect to an error in movement amounted, and FIG. 15 is a diagram in which a comparison and an evaluation are performed with respect to an error in movement direction.

<Error in Movement Amount>

A of FIG. 14 illustrates how a pedestrian was walking during verification. The pedestrian holding the positioning apparatus 10 and the comparative apparatus at the same position on the body walked while repeatedly stopping and moving (STOP & GO), where the pedestrian walked straight ahead a distance of 20 m, and temporarily stopped at three locations spaced five meters apart during the walking, each of three locations being marked with a circle.

B of FIG. 14 illustrates a trajectory of a position at which positioning is performed by each of the positioning apparatus 10 and the comparative apparatus for a period of time in which the pedestrian started walking, moved a distance of 20 m, and finished walking, as illustrated in A of FIG. 14. An XY-coordinate illustrated in B of FIG. 14 represents a position in a horizontal plane in the real space, where a movement path of the pedestrian is represented by an X-axis (a line along the X-axis) in the real space, with a position of start of walking being an origin.

In an XY-coordinate plane of B of FIG. 14, a movement trajectory r1 indicates a trajectory obtained by plotting, at regular time intervals, a position measured by the positioning apparatus 10 and by connecting the plotted positions using a line, and a movement trajectory r2 indicates a trajectory obtained by plotting, at regular time intervals, a position measured by the comparative apparatus and by connecting the plotted positions using a line.

B of FIG. 14 shows that the movement trajectory r2 obtained by the comparative apparatus is in parallel with a line along the X-axis that is an actual movement path of the pedestrian, and a movement direction of the pedestrian is almost exactly detected. On the other hand, the movement trajectory r2 shows a point of about 25 m as a point corresponding to a point at which the pedestrian reaches when he/she has walked 20 m, where an error of about five meters occurs in a movement amount.

On the other hand, the movement trajectory r1 obtained by the positioning apparatus 10 slightly deviates in a Y-axis direction from the line along the X-axis that is the actual movement path of the pedestrian. However, the movement trajectory r1 shows a point of about 20 m in an X-axis direction as a point corresponding to a point at which the pedestrian reaches when he/she has walked 20 m, where at least an error in movement amount is sufficiently smaller than that of the comparative apparatus.

Note that plots in a circled portion in the movement trajectory r1 are spaced more closely in the XY-coordinate plane than plots in the other portions, and this shows that the pedestrian has stopped. Such a phenomenon is seen in portions around points of 5 m, 10 m, and 15 m from the X-axis, and this coincides with the fact that the pedestrian actually stopped at those points. This also shows that, with respect to walking such as STOP & GO, the positioning apparatus 10 has a sufficiently smaller error in movement amount than that of the comparative apparatus not only when walking is finished, but also for an entire period of time from starting of walking to finishing of walking Further, an error in a position at which positioning is performed by the positioning apparatus 10 appears to be larger only in a Y-axis direction than that of the comparative apparatus, whereas such an error is hardly exhibited in the X-axis direction. Thus, the positioning apparatus 10 only exhibits an error of less than two meters.

On the other hand, an error in a position at which positioning is performed by the comparative apparatus is large in the X-axis direction, where the comparative apparatus exhibits an error of about five meters when the pedestrian finished walking 20 m.

Thus, compared with the comparative apparatus, the positioning apparatus 10 according to the present embodiment exhibits a smaller error in movement amount, and also exhibits a smaller error in a position at which positioning is performed.

<Error in Movement Direction>

In FIG. 15, A of FIG. 15 illustrates how a pedestrian was walking during verification. The pedestrian holding the positioning apparatus 10 and the comparative apparatus at the same position on the body looked away while walking, where the pedestrian walked straight ahead a distance of 20 m, and looked away to the left, to the right, and to the left every five meters during the walking.

B of FIG. 15 illustrates a trajectory of a position at which positioning is performed by each of the positioning apparatus 10 and the comparative apparatus for a period of time in which the pedestrian started walking, moved a distance of 20 m, and finished walking, as illustrated in A of FIG. 15. As in the case of FIG. 14, an XY-coordinate illustrated in B of FIG. 15 represents a position in a horizontal plane in the real space, where a movement path of the pedestrian is represented by an X-axis (a line along the X-axis) in the real space, with a position of start of walking being an origin.

In an XY-coordinate plane of B of FIG. 15, a movement trajectory r1 indicates a trajectory obtained by plotting, at regular time intervals, a position measured by the positioning apparatus 10 and by connecting the plotted positions using a line, and a movement trajectory r2 indicates a trajectory obtained by plotting, at regular time intervals, a position measured by the comparative apparatus and by connecting the plotted positions using a line.

B of FIG. 15 shows that the movement trajectory r2 obtained by the comparative apparatus deviates about three meters at most in a Y-axis direction from the line along the X-axis that is the actual movement path of the pedestrian. Such deviation in the Y-axis direction is caused since an error in a movement direction detected by the comparative apparatus is caused due to the pedestrian looking away while walking.

On the other hand, the movement trajectory r1 obtained by the positioning apparatus 10 deviates about one meter in the Y-axis direction from the line along the X-axis that is the actual movement path of the pedestrian. The deviation is sufficiently smaller than that of the comparative apparatus.

Focused on a circled portion in the movement trajectory r1, a line between plots of the positioning apparatus 10 is oriented to an X-axis direction further than that of the comparative apparatus at the same time.

This shows that an error in a movement direction detected by the positioning apparatus 10 is sufficiently smaller than that of the comparative apparatus.

Further, an error in a position at which positioning is performed by the positioning apparatus 10 is hardly exhibited in the X-axis direction. The positioning apparatus 10 only exhibits an error of about one meter at most even when both of the errors caused in the X-axis direction and in the Y-axis direction are considered.

Thus, compared with the comparative apparatus, the positioning apparatus 10 according to the present embodiment exhibits a smaller error in movement amount, and also exhibits a smaller error in a position at which positioning is performed.

This shows that, with respect to walking of STOP & GO with which an error in movement amount is easily caused, or looking away while walking with which an error in movement direction is easily caused, the positioning apparatus 10 according to the present technology is also capable of accurately performing positioning, as described above.

<Verification of Error>

FIG. 16 illustrates a factor that causes an error in detection of a movement amount or a movement direction that is performed by the comparative apparatus and can be handled with a sufficient degree of accuracy by the positioning apparatus 10 according to the present embodiment estimating a movement vector M. As illustrated in FIG. 16, factors that each cause an error in detection of a movement amount or a movement direction that is performed by the comparative apparatus are roughly classified into a factor related to a motion of a pedestrian, a factor related to a pedestrian (individual), and a factor related to a walking environment.

Figure 17:
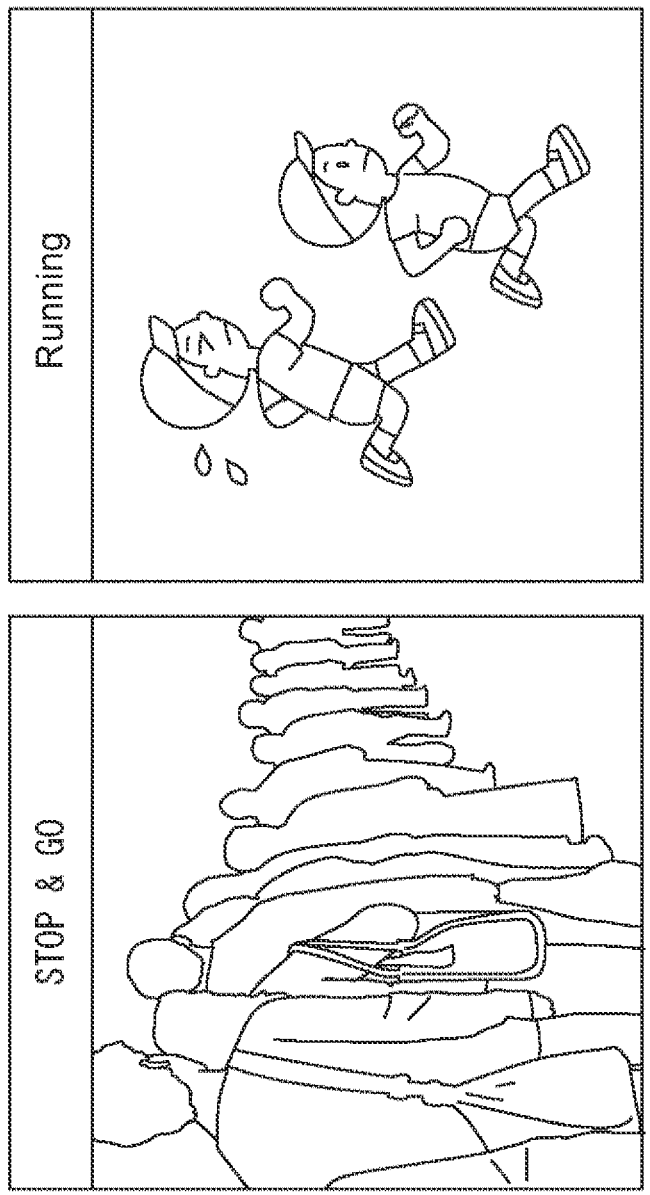
FIG. 17 illustrates a factor that causes an error in movement amount.
Figure 18:
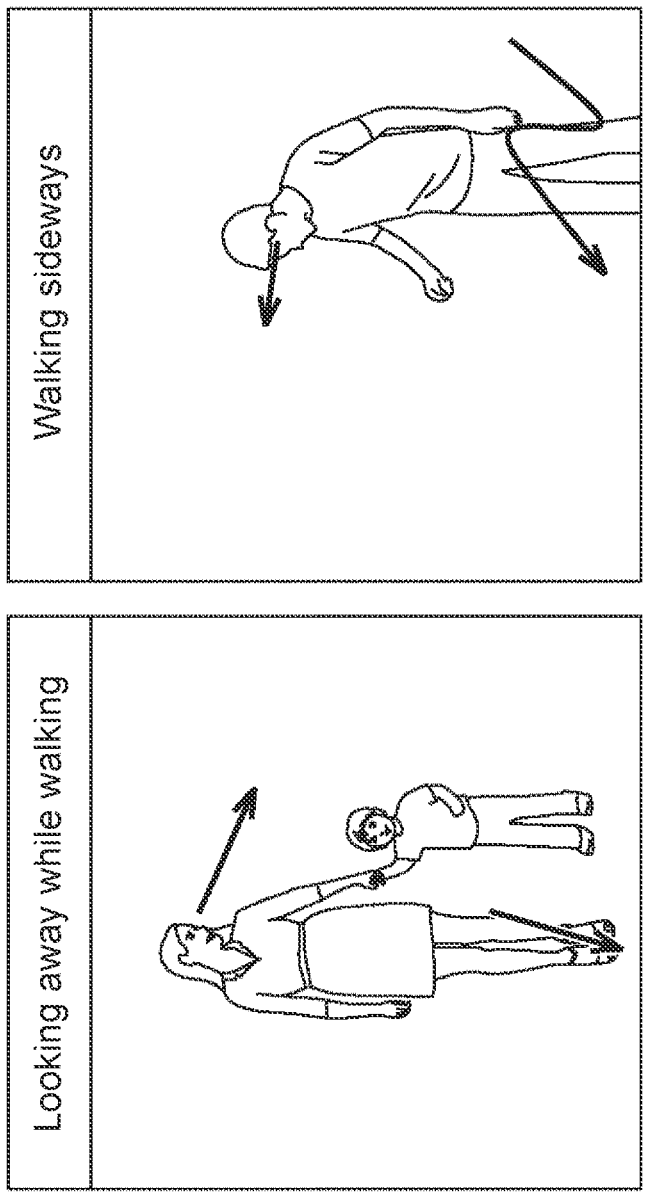
FIG. 18 illustrates a factor that causes an error in movement direction.

Examples of the factor related to a motion include "looking away while walking" (refer to FIG. 18), STOP & GO (refer to FIG. 17) and "walking slowly", "avoiding a person", "running" (refer to FIG. 17), and "walking sideways" (refer to FIG. 18).

Examples of the factor related to an individual include an "individual difference in how to walk", an "individual difference in how to hold/wear a terminal", and a "difference in shoes that an individual is wearing (sneakers, leather shoes, and high heels)".

Examples of the factor related to an environment include "stairs" and a "slope".

Further, a circle is given in "Error in movement amount" situated to the right side of a factor when the factor greatly affects an error in a movement amount of the comparative apparatus, and a circle is given in "Error in movement direction" situated further to the right when the factor greatly affects an error in a movement direction of the comparative apparatus.

On the other hand, the positioning apparatus 10 to which the present technology is applied is capable of suppressing an error caused due to a factor listed in FIG. 16, as described by performing comparison using actual measurement results with respect to the examples of "STOP & GO" (FIG. 14) and "looking away while walking" (FIG. 15).

<Effect Related to Body Part for Attachment>

Further, when a motion of walking is detected by the comparative apparatus and when a user wears the comparative apparatus on a body part with which the user is more likely to make a motion other than walking during the walking, the motion of walking is not properly detected, and an error is likely to be caused at a position at which positioning is performed.

Figure 19:
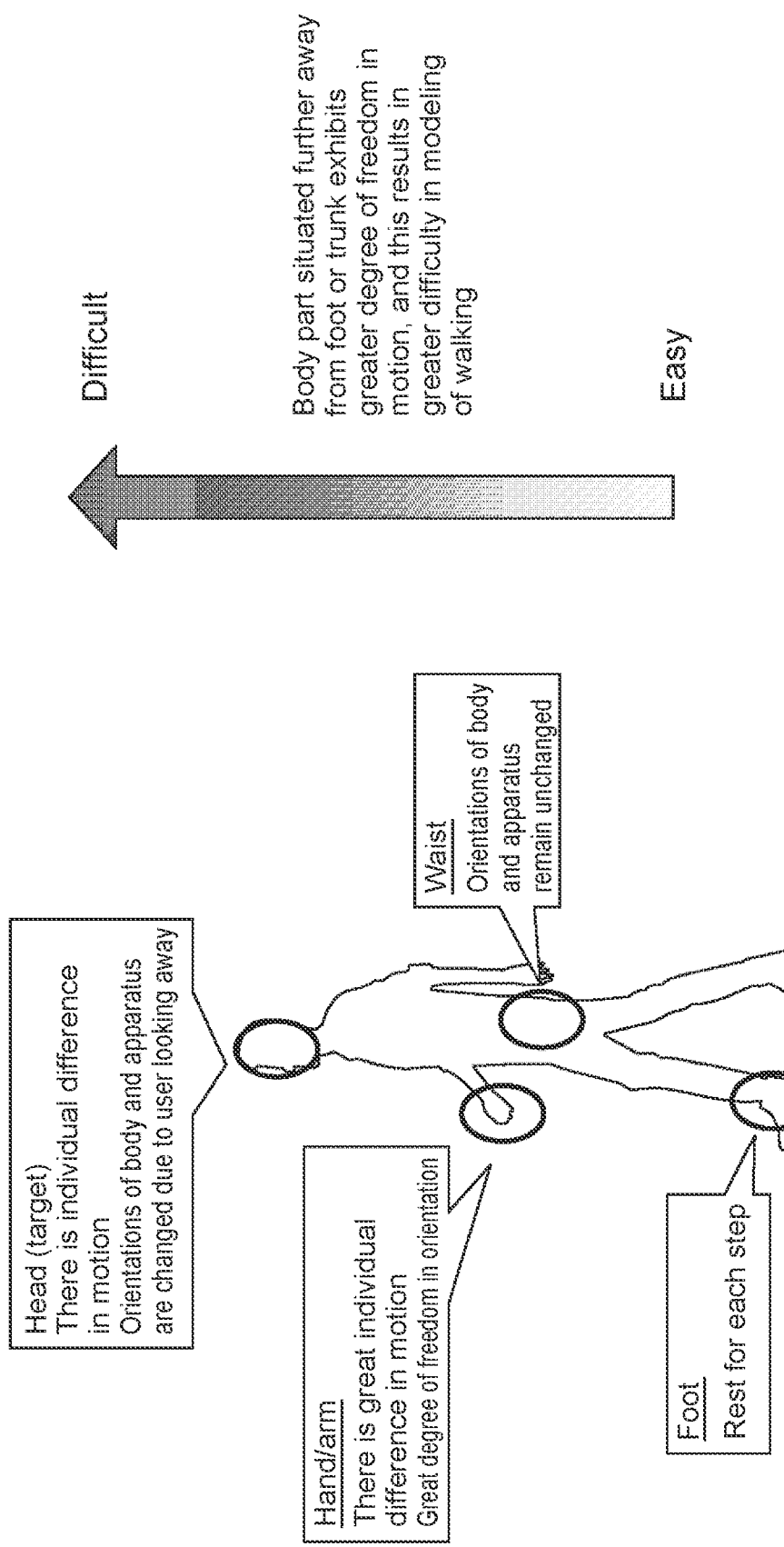
FIG. 19 is a diagram describing a difference in difficulty among body parts to which a sensor is attached when a movement amount is estimated using the number of steps and a length of stride.

As illustrated in FIG. 19, the foot is suitable as a body part to which the comparative apparatus is attached since the foot rests for each step during walking.

Further, the waist is also suitable as a body part for the attachment since orientations of the body and the comparative apparatus remain unchanged during walking.

On the other hand, the hand and the arm are not suitable as a body part to which the comparative apparatus is attached since there is a great individual difference in motion during walking, and there is also a great degree of freedom in orientation.

Further, the head is not suitable as a position to attach the comparative apparatus. The reason is that the degree of freedom is smaller than that of the hand or the arm, but there is an individual difference in motion and orientations of the body and the head are changed due to looking away.

In general, a body part situated further away from the foot or the trunk exhibits a greater degree of freedom in motion, and is less suitable as a body part to which the comparative apparatus is attached.

On the other hand, the positioning apparatus 10 according to the present embodiment is capable of suppressing an error caused due to a difference in a body part for attachment. This results in being able to accurately perform positioning without limitation on a body part for attachment.

Further, it is also possible to accurately perform positioning when the positioning apparatus 10 is attached to the head. Thus, it is also effective to include the positioning apparatus 10 in a head-mounted apparatus (such as a head-mounted display) that is used for vision AR or hearable AR.

Furthermore, when the positioning apparatus 10 is included in a head-mounted apparatus, the positioning apparatus 10 is also capable of measuring a position (height) of the head when the user is in a motion such as squatting down or lying down on his/her stomach. Thus, it is effective to use the positioning apparatus 10 for vision AR or hearable AR since it is possible to directly grasp positions of the eyes and the ears.

<Effect Related to Error Region>

Figure 20:
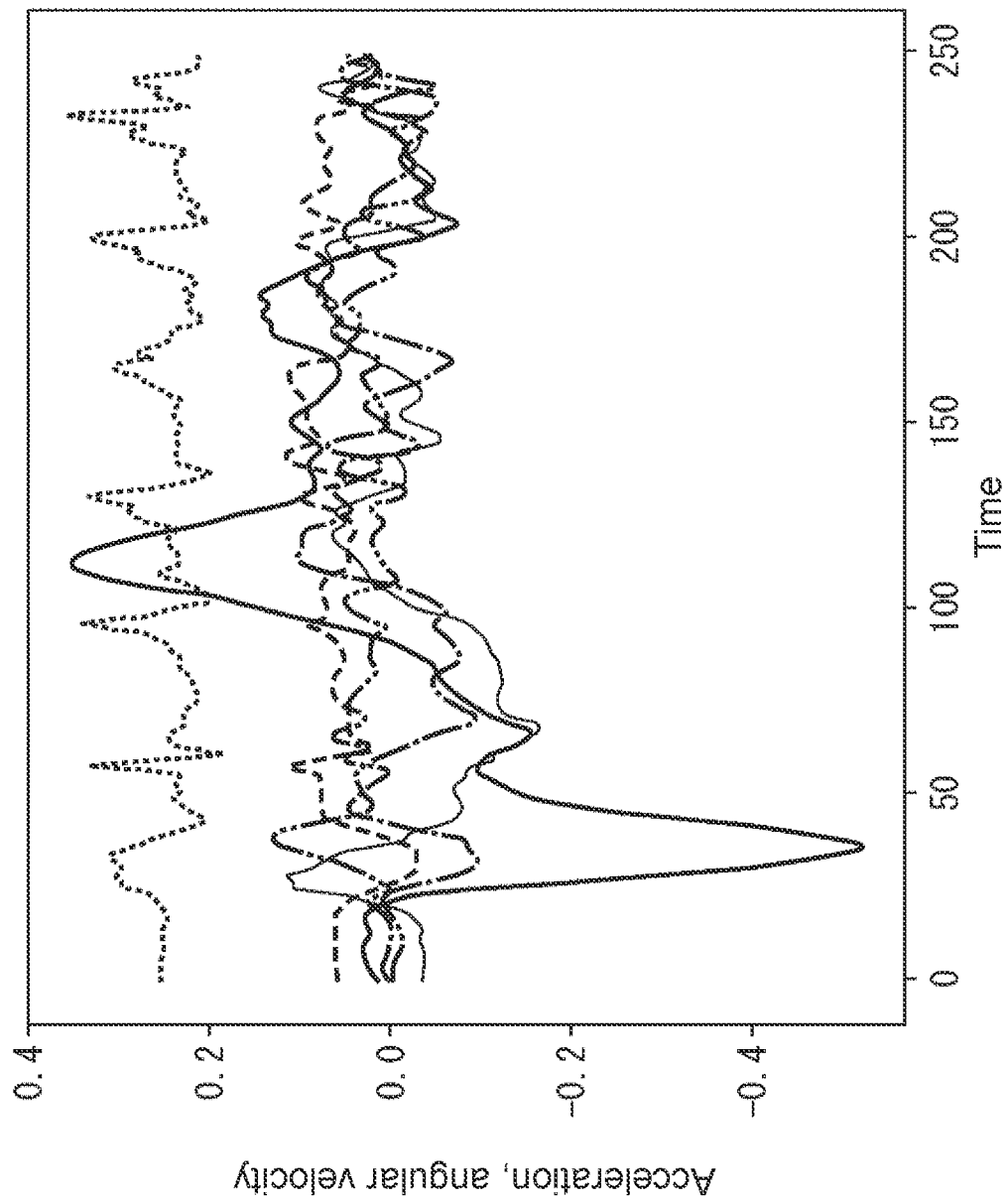
FIG. 20 is a diagram describing a difference in error in movement vector between the positioning apparatus to which the present technology is applied, and the comparative apparatus.

Further, FIG. 20 illustrates acceleration data and angular velocity data respectively output from the three-axis acceleration sensor and the three-axis angular velocity sensor pedestrian that are held by a pedestrian when the pedestrian takes a step in a specified direction to move a distance of ½ (m). On the other hand, A of FIG. 21 illustrates a vector 120 that indicates a movement amount and a movement direction that are calculated by the comparative apparatus on the basis of the acceleration data and the angular velocity data of FIG. 20, and an error range a of the calculated movement amount and movement direction.

The comparative apparatus separately calculates the movement amount and the movement direction on the basis of the acceleration data and the angular velocity data. Thus, as illustrated in A of FIG. 21, the error range a of the movement amount and the movement direction is an elongated non-circular range along an arc that is centered on a start point of the vector 120 and is drawn to pass through an end point of the movement vector 120.

Figure 21:
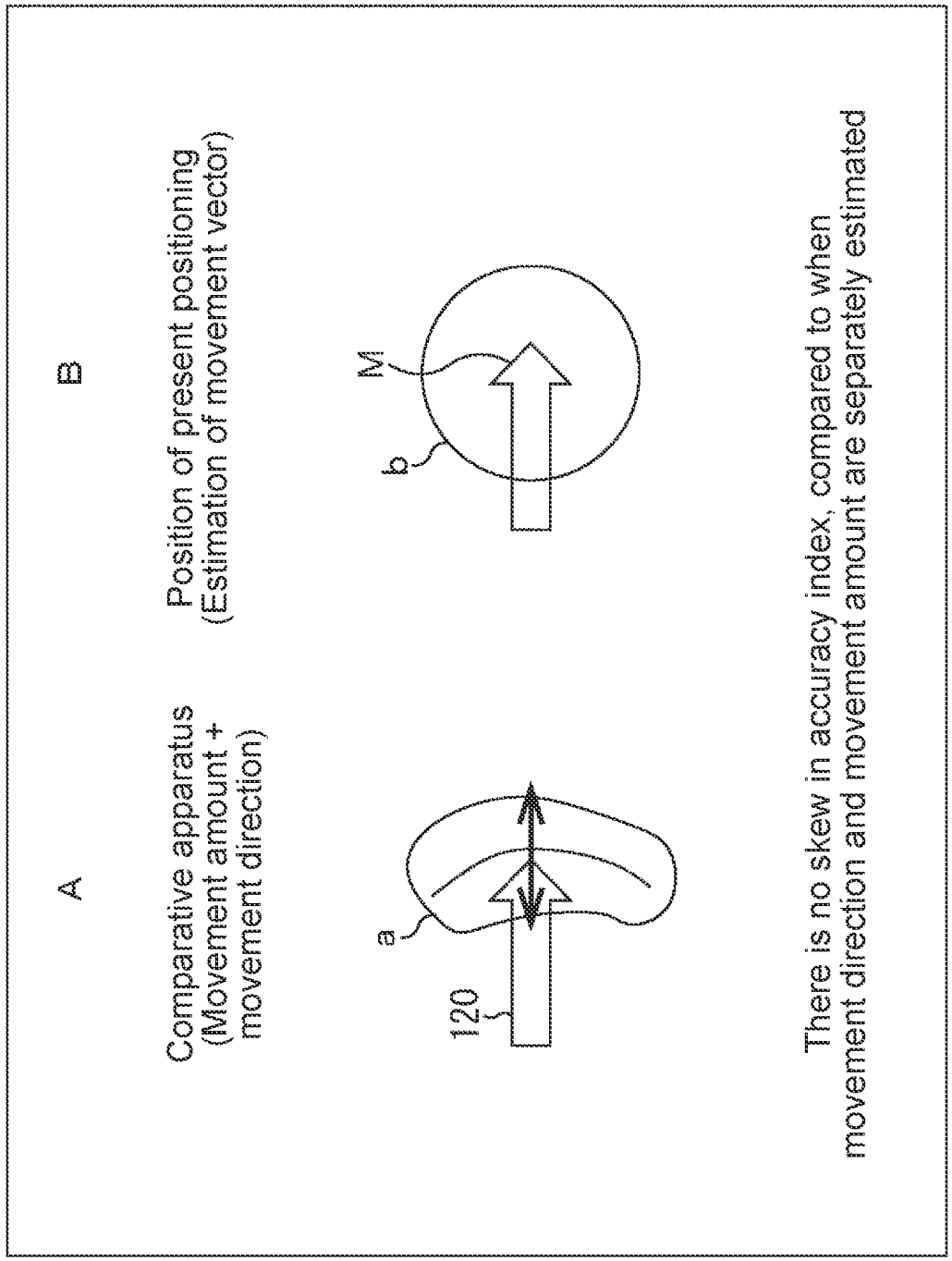
FIG. 21 is a diagram describing the difference in error in movement vector between the positioning apparatus to which the present technology is applied, and the comparative apparatus.

On the other hand, B of FIG. 21 illustrates a movement vector M estimated by the movement vector estimator 48 of the positioning apparatus 10 according to the present embodiment on the basis of the acceleration data and the angular velocity data of FIG. 20, and an error range b of the movement vector M.

The positioning apparatus 10 estimates the movement vector M directly from an acceleration data signal and the angular velocity data. Thus, as indicated by the error range b, the range is a substantially circular range centered on an end point of the movement vector M. As an accuracy index at low speed, the error of the error range b is superior to the error of the error range a in the case of the comparative apparatus.

Further, the positioning apparatus 10 according to the present embodiment also provides effects indicated below.

The positioning apparatus 10 is capable of outputting an estimated position at any timing since the timing of updating a position does not depend on a step. When positioning performed by the positioning apparatus 10 is applied to augmented reality (AR), this makes it possible to update, at any timing, a position at which an augmented image is formed (displayed). This results in a smooth presentation.

Further, it is possible to integrate the positioning apparatus 10 with a global navigation satellite system (GNSS) using, for example, a Kalman filter, and to produce a GNSS receiver having an excellent performance in an underpass, a tunnel, and a street of big buildings.

Further, it is possible to incorporate the positioning apparatus 10 into a head-mounted apparatus. This is more effective than separately attaching the positioning apparatus 10 and the head-mounted apparatus.

Further, it is possible to incorporate the positioning apparatus 10 into a smartphone, and thus to use for vision AR by use of a display of the smartphone.

Furthermore, the positioning apparatus 10 is capable of performing positioning regardless of various holding states such as being held for a call, a being held in a pocket, and being held in the hand. Thus, it is possible to obtain a vision AR application for a smartphone, the vision AR application for a smartphone allowing the behaviors such as being turned sideways or being in a calling state during the use of the positioning apparatus 10, or being put in a pocket when a user does not view a screen.

Other Embodiments

<Other Embodiments for Calculating Magnetic-North Direction>

In the embodiment illustrated in FIG. 2, the pose estimator 46 of the AHRS 32 determines that a geomagnetic direction in the device coordinate system that is detected on the basis of a geomagnetic signal supplied by the geomagnetic sensor 45 is a magnetic-north direction in the device coordinate system without a change. However, calculation processing indicated below may be performed to determine a magnetic-north direction, taking a geomagnetic disturbance into consideration.

Figure 22:
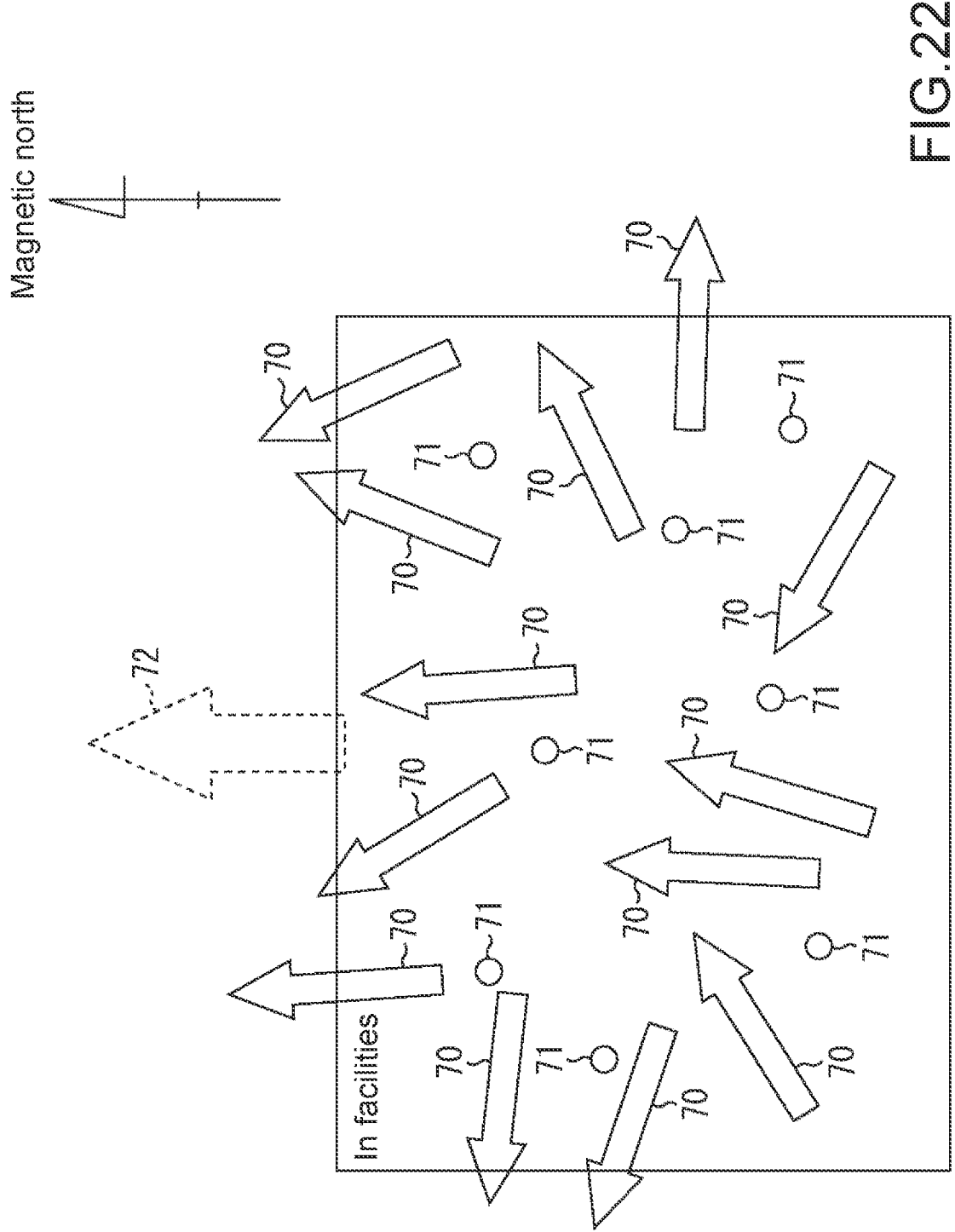
FIG. 22 illustrates a geomagnetic disturbance in facilities.

The geomagnetic disturbance is caused due to an influence of the surrounding environment, and there is a possibility that the geomagnetic direction will not indicate a true-magnetic-north direction. FIG. 22 illustrates a geomagnetic disturbance in facilities. FIG. 22 illustrates a geomagnetic vector 70 using a solid arrow, the geomagnetic vector 70 representing a geomagnetic direction in each place of the facilities.

As indicated by the geomagnetic vector 70 illustrated in FIG. 22, the geomagnetic direction in the facilities is oriented in various directions in a dispersed manner due to an influence of a wall or an electronic apparatus (not illustrated) that is arranged in the facilities, and there exists a place in which the geomagnetic direction is different from the true-magnetic-north direction (an upward direction on the surface of the sheet of the figure). In such a case, if a geomagnetic direction that is detected in a single place is determined to be the magnetic-north direction, there may be a great difference between the determined magnetic-north direction and the true-magnetic-north direction.

Thus, the pose estimator 46 may detect and collect the geomagnetic direction in a plurality of places on the basis of a geomagnetic signal supplied by the geomagnetic sensor 45, and may calculate, as the magnetic-north direction, an average direction obtained by averaging the collected geomagnetic directions.

Accordingly, for example, the geomagnetic directions in a plurality of places 71 in the facilities that is indicated by circles illustrated in FIG. 22 are collected, and an average direction 72 of the collected geomagnetic directions is calculated as the magnetic-north direction. The average direction 72 substantially coincides with the true north magnetic direction. As described above, by calculating an average direction of geomagnetic directions in a plurality of places as the magnetic-north direction, an error in detecting the magnetic-north direction is reduced with respect to a variation in geomagnetic direction due to an influence of the surrounding environment.

Processing performed by the pose estimator 46 when such processing of calculating the magnetic-north direction is performed, is described.

(Collection of Geomagnetic Direction)

First, the pose estimator 46 detects geomagnetic directions in a plurality of places on the basis of a geomagnetic signal supplied by the geomagnetic sensor 45, and collects the geomagnetic directions in the plurality of places.

The geomagnetic direction may be collected at specified time intervals when a pedestrian is moving, the specified time interval being set in advance, and the collection of the geomagnetic direction may be finished when a preset number of detections of the geomagnetic direction is completed, or when a preset specified period of time has elapsed since the geomagnetic direction started to be collected. Further, the geomagnetic direction may be collected in consideration of a place in which the geomagnetic direction is detected, which will be described later. The collection method is not limited to a specific method. Furthermore, when the geomagnetic direction is collected, a pedestrian who is holding the positioning apparatus 10 may consciously move in the facilities, or the geomagnetic direction may be collected when the pedestrian moves without being aware of the collection of the geomagnetic direction.

Further, during collection of geomagnetic directions in a plurality of places, the pose estimator 46 acquires, from the sensor combiner 38, a coordinate value P that indicates a current position (an absolute position) of the device. Accordingly, the pose estimator 46 knows a place in which a geomagnetic direction is detected. This makes it possible to avoid redundantly detecting a geomagnetic direction in the same place.

Note that, when the magnetic-north direction has never been calculated, the pose estimator 46 obtains pose data using a magnetic-north direction detected in a single place, and supplies the obtained pose data to the coordinate converter 56 of the sensor combiner 38.

Further, during collection of a geomagnetic direction, the pose estimator 46 estimates a change in a relative pose with respect to an initial pose (an initial orientation) of the device on the basis of angular velocity data ($\omega x$, $\omega y$, $\omega z$) supplied by the IMU calibrator 44.

(Calculation of Average Direction of Geomagnetic Directions)

when the collection of the geomagnetic direction is completed, the pose estimator 46 calculates an average direction obtained by averaging the collected geomagnetic directions.

Here, detection of a geomagnetic direction performed by the pose estimator 46 is processing of detecting a geomagnetic direction in the device coordinate system on the basis of a geomagnetic signal from the geomagnetic sensor 45. Specifically, the detection of a geomagnetic direction corresponds to detecting, on the basis of a geomagnetic signal from the geomagnetic sensor 45, an xyz component value of a geomagnetic-direction vector that represents a geomagnetic direction in the device coordinate system in the form of a vector. Here, it is assumed that the geomagnetic-direction vector is a unit vector without taking into consideration the strength of geomagnetism.

On the other hand, when there is a change in a pose of the device during collection of a geomagnetic direction (geomagnetic-direction vector), directions of the X-axis, Y-axis, and Z-axis of the device coordinate system in the real space are changed. Thus, if geomagnetic-direction vectors detected in a plurality of places are expressed in a single device coordinate system using xyz component values obtained upon the detection, this will not correctly represent a geomagnetic direction in each place in the real space.

Thus, the pose estimator 46 calculates an xyz component value when geomagnetic-direction vectors detected in a plurality of places are represented by a device coordinate system of a single place.

Specifically, it is assumed that respective geomagnetic-direction vectors detected in a plurality of places are first to nth geomagnetic-direction vectors (n is an integer more than one) in order of detection, and the respective places in which the first to nth geomagnetic-direction vectors are detected are first to nth places. The pose estimator 46 calculates xyz-component values when the first to nth geomagnetic-direction vectors are represented by a device coordinate system of the nth place.

When a desired geomagnetic-direction vector from among the first to (n−1) geomagnetic-direction vectors is represented by an mth geomagnetic-direction vector (m is an arbitrary integer from one to (n−1)), the pose estimator 46 obtains a change in a relative pose of the device that is caused when a pedestrian moves from the mth place to the nth place, on the basis of a change in a relative pose of the device that is estimated during collection of a geomagnetic direction.

Then, on the basis of the obtained change in a relative pose of the device, the pose estimator 46 calculates an xyz component value when a geomagnetic direction in the mth place in the real space that is represented by the mth geomagnetic-direction vector, is represented by the device coordinate system of the nth place.

Note that the pose estimator 46 calculates an xyz component value when the first to (n−1) geomagnetic-direction vectors are represented by the device coordinate system of the nth place in which the geomagnetic direction was last detected. However, a target device coordinate system by which the geomagnetic-direction vector is represented is not limited to the device coordinate system of the nth place. For example, if a change in a relative pose of the device continues to be estimated after collection of a geomagnetic direction is completed, a device coordinate system of any place or any time after the collection of a geomagnetic direction is completed, may be used as the target device coordinate system by which a geomagnetic-direction vector is represented. In this case, the pose estimator 46 also calculates an xyz component value when the nth geomagnetic-direction vector is represented by the target device coordinate system by which a geomagnetic-direction vector is represented, as in the case of the first to (n−1) geomagnetic-direction vectors.

Further, in the description of processing indicated below, the target device coordinate system by which a geomagnetic-direction vector is represented is simply referred to as a device coordinate system without stating which device coordinate system of which place or which time the target device coordinate system is.

(Calculation of Average Direction of Geomagnetic Directions and Determination of Magnetic-North Direction)

Next, the pose estimator 46 calculates an arithmetic mean of all of the geomagnetic directions (the first to nth geomagnetic-direction vectors) collected in the first to nth places, and sets, to be an average direction of all of the geomagnetic directions collected in the first to nth places, a direction of a vector that is indicated by the calculated arithmetic mean.

Then, the pose estimator 46 determines, to be a north direction, the average direction of all of the geomagnetic directions collected in the first to nth places.

Note that a direction of a vector that is indicated by a sum of the first to nth geomagnetic-direction vectors before division by n is performed to obtain an arithmetic mean of the first to nth geomagnetic-direction vectors, may be used as an average direction. Further, it has been assumed that the geomagnetic-direction vector is a unit vector without taking into consideration the strength of geomagnetism, but the pose estimator 46 may also detect the strength of geomagnetism when the pose estimator 46 detects a geomagnetic direction, may set, to be a geomagnetic-direction vector, a vector that indicates a geomagnetic direction in a place in which the geomagnetic direction is detected, and has a magnitude depending on the strength of geomagnetism in the detection place. In this case, the pose estimator 46 calculates a vector of an arithmetic mean of geomagnetic-direction vectors detected in a plurality of places, and determines a magnetic-north direction using a direction of a vector of the calculated arithmetic mean as an average direction. This results in being able to obtain a magnetic-north direction in consideration of the strength of geomagnetism in each place.

(Estimation of Pose of Device)

When the pose estimator 46 determines the magnetic-north direction in the device coordinate system, as described above, the pose estimator 46 detects a vertical direction in the device coordinate system on the basis of acceleration data (Ax, Ay, Az) and angular velocity data ($\omega$x, $\omega$y, $\omega$z) that are supplied by the IMU calibrator 44, and detects a true-north direction in the device coordinate system on the basis of the detected vertical direction and the magnetic-north direction. Then, the pose estimator 46 detects a pose of the device in the world coordinate system on the basis of the detected vertical direction and the true-north direction.

Thereafter, using the detected pose of the device as an initial pose, the pose estimator 46 estimates a change in a relative pose with respect to the initial pose of the device on the basis of the angular velocity data ($\omega$x, $\omega$y, $\omega$z) supplied by the IMU calibrator 44. Then, the pose estimator 46 estimates a pose of the device in the world-coordinate system on the basis of the initial pose and the estimated change in a relative pose of the device.

Not only is the calculation of the magnetic-north direction described above performed at the time of starting positioning, but the calculation of the magnetic-north direction described above may also be repeatedly performed at specified time intervals. In this case, the pose estimator 46 obtains a pose of the device on the basis of the calculated magnetic-north direction every time the pose estimator 46 calculates the magnetic-north direction. Thereafter, using the obtained pose of the device as an initial pose, the pose estimator 46 estimates a change in a relative pose with respect to the initial pose to estimate a pose of the device.

(Mode Related to Collection of Geomagnetic Direction)

Subsequently, the collection of geomagnetic directions in a plurality of places for calculating a magnetic-north direction is further described.

Figure 23:
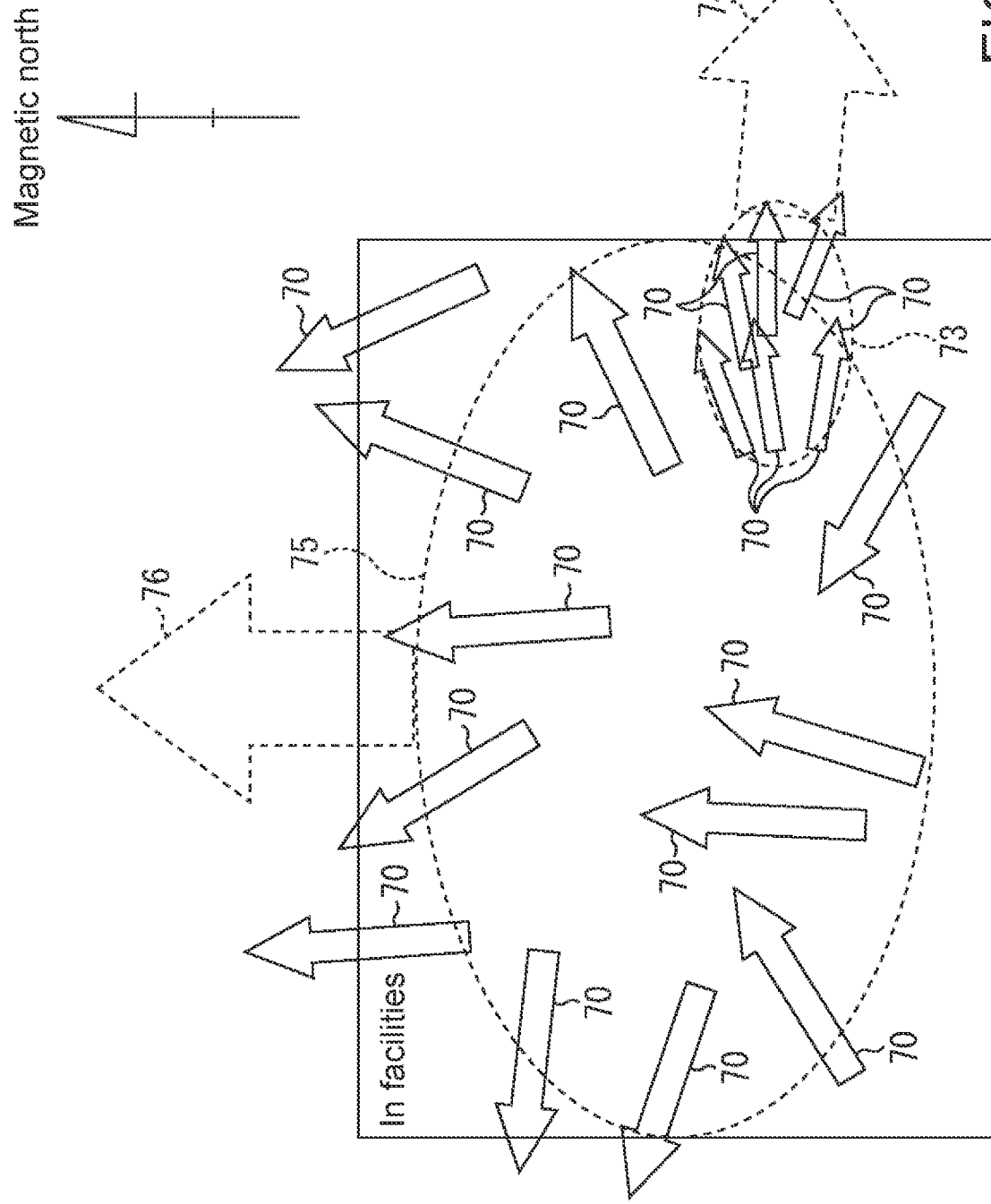
FIG. 23 illustrates the geomagnetic disturbance in the facilities.

FIG. 23 illustrates the geomagnetic disturbance in the facilities as in the case of FIG. 22, and the same element as that in FIG. 22 is denoted by the same reference numeral, and a description thereof is omitted.

In almost all of the places in a local region 73 in the facilities, the direction of the geomagnetic vector 70 may be greatly different from the true-magnetic-north direction and the geomagnetic vector 70 may be oriented toward substantially the same direction. In this case, even if geomagnetic directions are detected in a plurality of places in the region 73 and an average direction 74 of the geomagnetic directions is calculated as the magnetic-north direction, the calculated average direction 74 will be greatly different from the true-magnetic-north direction. On the other hand, in a wide region 75 in the facilities, the geomagnetic disturbance may be caused in each place due to an influence of the surrounding environment, but the geomagnetic vector 70 is generally irregularly oriented toward different directions, with the true-magnetic-north direction being used as a reference. Thus, when the geomagnetic directions are detected in a plurality of places in the wide region 75, and an average direction 76 of the geomagnetic directions is calculated as the magnetic-north direction, the calculated average direction 76 substantially coincides with the true-magnetic-north direction. This results in being able to appropriately detect the true-magnetic-north direction.

Thus, with respect to all of the places in which the geomagnetic direction has already been detected, the pose estimator 46 detects, during collection of geomagnetic directions in a plurality of places, a geomagnetic direction when places are spaced from each other by a distance not less than a specified distance (for example, two meters), on the basis of information regarding a position of the device that is acquired from the sensor combiner 38 described later. In other words, the pose estimator 46 detects geomagnetic directions in places that are spaced from each other by a distance not less than a specified distance.

Then, the pose estimator 46 finishes the collection of a geomagnetic direction when a smallest circle surrounding all of the places in which a geomagnetic direction has been collected has a diameter of a length not less than a specified length (for example, ten meters).

<External Sensor 36>

In the embodiment of the present technology, any positioning method may be used as a positioning method using the external sensor 36 as long as it specifies, using an arbitrary absolute coordinate system, the position of the device in the real space in which the positioning apparatus 10 is actually moved. Examples of an adoptable positioning method include a positioning method using a global navigation satellite system (GNSS) using satellite information, such as the Global Positioning System (GPS); a positioning method using a signal (such as a beacon signal) from an apparatus that performs wireless communication in accordance with Wi-Fi (registered trademark), Bluetooth (registered trademark), iBeacon (registered trademark), ultra-wideband (UWB), or other wireless communication standards; and a positioning method using information regarding a location of a base-station apparatus of a wireless communication network. Further, a positioning method using an environmental installation camera or a camera on an apparatus (such as SLAM), or a positioning method using map matching can also be adopted.

<Positioning Target>

The embodiments of the present technology have been described on the assumption that a pedestrian is a primary movable body that is a positioning target that holds the positioning apparatus 10, but the pedestrians also include a person who does not intend to walk. The positioning-target movable body is not limited to a pedestrian, and any movable body, such as an automobile and a bicycle, that can be moved may be a positioning target. It is also possible to incorporate, into a movable body, the positioning apparatus 10 to which the present technology is applied.

<Application to Two Dimensions>

The embodiments of the present technology have been described on the assumption that three-dimensional positioning is performed with respect to latitude, longitude, and altitude in an absolute coordinate system. However, two-dimensional positioning may be performed only with respect to latitude and longitude. In this case, the PDR section 60 for obtaining an absolute position may be configured to not calculate an altitude value included in a coordinate value (latitude value, longitude value, altitude value) of the geographic coordinate system with respect to a displacement vector D from the integration section 58. Further, the coordinate converter 56 may be configured to not calculate a component value of a height direction of the world coordinate system. Furthermore, the integration section 58 may be configured to not calculate the component value of the height direction of the world coordinate system. In the other processing sections, a change to the application to two dimensions may be easily performed as appropriate.

<Other Effects>

Further, the effects described herein are not limitative but are merely illustrative, and other effects may be provided.

<Program>

Further, a portion of or all of the series of processes in the DNN 34, the sensor combiner 38, the pose estimator 46, the coordinate converter 56, the integration section 58, and the PDR section 60 for obtaining an absolute position that are illustrated in FIG. 2, can be performed using hardware or software. When the series of processes is performed using software, a program included in the software is installed on a computer. Here, examples of the computer include a computer incorporated into dedicated hardware, and a computer such as a general-purpose personal computer that is capable of performing various functions by various programs being installed thereon.

Figure 24:
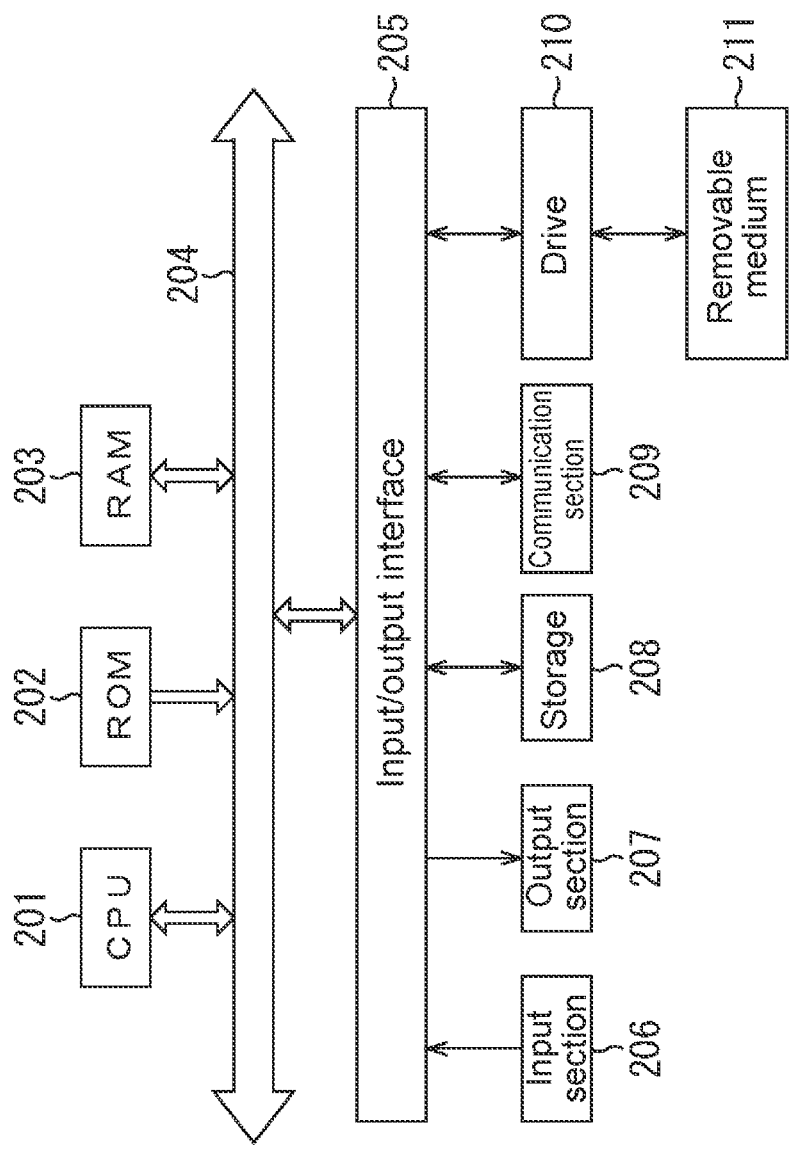
FIG. 24 is a block diagram of a configuration example of hardware of a computer that performs a series of processes using a program.

FIG. 24 is a block diagram of a configuration example of hardware of a computer that performs the series of processes described above using a program.

In the computer, a central processing unit (CPU) 201, a read only memory (ROM) 202, and a random access memory (RAM) 203 are connected to one another through a bus 204.

Further, an input/output interface 205 is connected to the bus 204. An input section 206, an output section 207, a storage 208, a communication section 209, and a drive 210 are connected to the input/output interface 205.

The input section 206 includes, for example, a keyboard, a mouse, and a microphone. The output section 207 includes, for example, a display and a speaker. The storage 208 includes, for example, a hard disk and a nonvolatile memory. The communication section 209 includes, for example, a network interface. The drive 210 drives a removable medium 211 such as a magnetic disk, an optical disk, a magneto-optical disk, or a semiconductor memory.

In the computer having the configuration described above, for example, the series of processes described above is performed by the CPU 201 loading a program stored in the storage 208 into the RAM 203 and executing the program via the input/output interface 205 and the bus 204.

For example, the program executed by the computer (the CPU 201) can be provided by being stored in the removable medium 211 serving as, for example, a package medium. Further, the program can be provided via a wired or wireless transmission medium such as a local area network, the Internet, or digital satellite broadcasting.

In the computer, the program can be installed on the storage 208 via input/output interface 205 by the removable media 211 being mounted on the drive 210. Further, the program can be received by the communication section 209 via the wired or wireless transmission medium to be installed on the storage 208. Moreover, the program can be installed in advance on the ROM 202 or the storage 208.

Note that the program executed by the computer may be a program in which processes are chronologically performed in the order of the description herein, or may be a program in which processes are performed in parallel or a process is performed at a necessary timing such as a timing of calling.

Note that the present technology may also take the following configurations.

<1> A positioning apparatus, including:
  a movement vector estimator that estimates a movement vector using a machine learning model on the basis of acceleration of a device and an angular velocity of the device, the movement vector indicating a movement amount and a movement direction of the device, the acceleration being detected by an acceleration sensor that is used to detect the acceleration, the angular velocity being detected by an angular velocity sensor that is used to detect the angular velocity; and an integration section that integrates the movement vector and calculates a relative position of the device.

<2> The positioning apparatus according to <1>, in which
on the basis of the acceleration detected by the acceleration sensor and the angular velocity detected by the angular velocity sensor, the movement vector estimator estimates, using the machine learning model, the movement vector indicating the movement amount and the movement direction and being represented by a device coordinate system that is fixed to the device.

<3> The positioning apparatus according to claim 2, further including
a converter that converts, into the movement vector in a world coordinate system, the movement vector being represented by the device coordinate system and estimated by the movement vector estimator, the world coordinate system being fixed in a real space, in which
the integration section integrates the movement vector in the world coordinate system that is obtained by the conversion performed by the converter, and calculates a relative position of the device with respect to a specified reference position in the real space.

<4> The positioning apparatus according to <3>, further including
a pose estimator that detects a pose of the device in the world coordinate system, in which
on the basis of the pose detected by the pose estimator, the converter converts the movement vector estimated by the movement vector estimator into the movement vector in the world coordinate system.

<5> The positioning apparatus according to <4>, further including
a geomagnetic sensor that detects a geomagnetic direction in the device coordinate system, in which
the pose estimator detects the pose of the device on the basis of the geomagnetic direction detected by the geomagnetic sensor.

<6> The positioning apparatus according to <5>, in which
the pose estimator detects the pose of the device on the basis of an average direction of the geomagnetic directions respectively detected in a plurality of places by the geomagnetic sensor.

<7> The positioning apparatus according to <6>, in which
the pose estimator detects the pose of the device on the basis of the average direction of the geomagnetic directions respectively detected in the plurality of places spaced from each other by a distance not less than a specified distance.

<8> The positioning apparatus according to any one of <1> to <3>, further including
an absolute-position obtaining section that calculates an absolute position of the device on the basis of the relative position of the device with respect to the reference position, the relative position being calculated by the integration section, the absolute position being a position in an absolute coordinate system of which a coordinate value is determined in advance with respect to the real space, the absolute position being a position in the real space that corresponds to the relative position.

<9> The positioning apparatus according to <8>, further including
an external sensor that acquires the absolute position of the device in the absolute coordinate system, in which
the absolute-position obtaining section sets the reference position in the absolute coordinate system on the basis of the absolute position of the device that is acquired by the external sensor, and calculates the absolute position of the device on the basis of the set reference position and the relative position.

<10> The positioning apparatus according to <9>, further including
a pose estimator that detects a pose of the device using information from the external sensor, in which
on the basis of the pose detected by the pose estimator, the converter converts the movement vector estimated by the movement vector estimator into the movement vector in the world coordinate system.

<11> The positioning apparatus according to any one of <2> to <10>, in which
the acceleration detected by the acceleration sensor and the angular velocity detected by the angular velocity sensor are input to the machine learning model as input data for a specified period of time for estimating a movement vector, and
correspondingly to the input data, the movement vector indicating the movement amount and the movement direction and being represented by the device coordinate system, is output from the machine learning model for each specified period of time for estimating a movement vector, the movement amount and the movement direction being an amount and a direction of movement that is estimated to have been performed by the device for the specified period of time for estimating a movement vector.

<12> The positioning apparatus according to any one of <2> to <11>, in which
the acceleration sensor detects the acceleration in directions of three axes that are orthogonal to each other,
the angular velocity sensor detects the angular velocity in the directions of the three axes, and
the movement vector estimator estimates the movement vector in the device coordinate system in the form of a component value of the directions of the orthogonal three axes of the device coordinate system.

<13> The positioning apparatus according to any one of <1> to <12>, in which
the machine learning model is trained in advance using walking data for learning, and
the walking data for learning includes input data and the movement vector used as a correct answer for the input data, the input data corresponding to the acceleration and the angular velocity respectively acquired by the acceleration sensor and the angular velocity sensor when the device is held by a pedestrian.

<14> The positioning apparatus according to any one of <1> to <13>, in which
the machine learning model has a configuration of a neural network.

<15> A positioning method, including:
estimating, by a movement vector estimator included in a positioning apparatus, a movement vector using a machine learning model on the basis of acceleration of a device and an angular velocity of the device, the movement vector indicating a movement amount and a movement direction of the device, the acceleration being detected by an acceleration sensor that is used to detect the acceleration, the angular velocity being detected by an angular velocity sensor that is used to detect the angular velocity; and integrating, by an integration section included in the positioning apparatus, the movement vector and calculates a relative position of the device.

<16> A program that causes a computer to operate as a movement vector estimator and an integration section, the movement vector estimator estimating a movement vector using a machine learning model on the basis of acceleration of a device and an angular velocity of the device, the movement vector indicating a movement amount and a movement direction of the device, the acceleration being detected by an acceleration sensor that is used to detect the acceleration, the angular velocity being detected by an angular velocity sensor that is used to detect the angular velocity, and the integration section integrating the movement vector and calculates a relative position of the device.

REFERENCE SIGNS LIST 10 positioning apparatus
30 IMU
32 AHRS
34 DNN
36 external sensor
38 sensor combiner
40 acceleration sensor
42 angular velocity sensor
46 pose estimator
48 movement vector estimator
50 sensor section
52 positioning-map-data storage
54 positioning section
56 coordinate converter
58 integration section
60 PDR section for obtaining absolute position
90 model generator
92 data collector
14, 100 machine learning model

The invention claimed is:

1. A positioning apparatus, comprising:
a movement vector estimator configured to estimate a movement vector using a machine learning model,
wherein the estimated movement vector indicates a movement amount and a movement direction of a device in a predetermined time period,
wherein the movement vector is estimated on a basis of input data to the machine learning model, the input data including acceleration of the device in the predetermined time period and an angular velocity of the device in the predetermined time period,
wherein the acceleration of the device is detected by an acceleration sensor, and
wherein the angular velocity of the device is detected by an angular velocity sensor;
an integration section configured to
integrate the estimated movement vector, and
calculate a relative position of the device for the predetermined time period with respect to a specified reference position in a real space; and a display control unit configured to initiate display of a trajectory of the relative position of the device for the predetermined time period with respect to the specified reference position in the real space,
wherein the machine learning model is trained in advance on a basis of acceleration of one or more devices in each of a plurality of prior predetermined time periods and an angular velocity of the one or more devices in each of the plurality of prior predetermined time periods, and
wherein the movement vector estimator and the integration section are each implemented via at least one processor.

2. The positioning apparatus according to claim 1,
wherein on the basis of the acceleration detected by the acceleration sensor and the angular velocity detected by the angular velocity sensor, the movement vector estimator estimates, using the machine learning model, the movement vector indicating the movement amount and the movement direction and being represented by a device coordinate system that is fixed to the device.

3. The positioning apparatus according to claim 2, further comprising:
a converter configured to convert, from the device coordinate system into a movement vector in a world coordinate system, the movement vector estimated by the movement vector estimator,
wherein the world coordinate system is fixed in the real space,
wherein the integration section integrates the movement vector in the world coordinate system that is obtained by the conversion performed by the converter, and
wherein the converter is implemented via at least one processor.

4. The positioning apparatus according to claim 3, further comprising:
a pose estimator configured to detect a pose of the device in the world coordinate system,
wherein on a basis of the pose detected by the pose estimator, the converter converts the movement vector estimated by the movement vector estimator into the movement vector in the world coordinate system, and
wherein the pose estimator is implemented via at least one processor.

5. The positioning apparatus according to claim 4, further comprising:
a geomagnetic sensor configured to detect a geomagnetic direction in the device coordinate system,
wherein the pose estimator detects the pose of the device on a basis of the geomagnetic direction detected by the geomagnetic sensor.

6. The positioning apparatus according to claim 5, wherein
the pose estimator detects the pose of the device on a basis of an average direction of the geomagnetic directions respectively detected in a plurality of places by the geomagnetic sensor.

7. The positioning apparatus according to claim 6, wherein
the pose estimator detects the pose of the device on a basis of the average direction of the geomagnetic directions respectively detected in the plurality of places spaced from each other by a distance not less than a specified distance.

8. The positioning apparatus according to claim 3, further comprising:
an absolute-position obtaining section configured to calculate an absolute position of the device on a basis of the relative position of the device with respect to the reference position, the relative position being calculated by the integration section, the absolute position being a position in an absolute coordinate system of which a coordinate value is determined in advance with respect to the real space, the absolute position being a position in the real space that corresponds to the relative position, and
wherein the absolute-position obtaining section is implemented via at least one processor.

9. The positioning apparatus according to claim 8, further comprising:
an external sensor configured to acquire information used to calculate the absolute position of the device in the absolute coordinate system,
wherein the absolute-position obtaining section is further configured to set the reference position in the absolute coordinate system on a basis of the absolute position of the device that is acquired by the external sensor, and
wherein the absolute-position obtaining section calculates the absolute position of the device on a basis of the set reference position and the relative position.

10. The positioning apparatus according to claim 9, further comprising:
a pose estimator configured to detect a pose of the device using information from the external sensor,
wherein on a basis of the pose detected by the pose estimator, the converter converts the movement vector estimated by the movement vector estimator into the movement vector in the world coordinate system, and
wherein the pose estimator is implemented via at least one processor.

11. The positioning apparatus according to claim 2, wherein
correspondingly to the input data, the movement vector indicating the movement amount and the movement direction and being represented by the device coordinate system, is output from the machine learning model for each specified period of time for estimating a movement vector, the movement amount and the movement direction being an amount and a direction of movement that is estimated to have been performed by the device for the specified period of time for estimating a movement vector.

12. The positioning apparatus according to claim 2, wherein
the acceleration sensor detects the acceleration in directions of three axes that are orthogonal to each other,
the angular velocity sensor detects the angular velocity in the directions of the three axes, and
the movement vector estimator estimates the movement vector in the device coordinate system in the form of a component value of the directions of the orthogonal three axes of the device coordinate system.

13. The positioning apparatus according to claim 1, wherein
the machine learning model is trained in advance using walking data for learning, and
the walking data for learning includes input data and the movement vector used as a correct answer for the input data, the input data corresponding to the acceleration and the angular velocity respectively acquired by the acceleration sensor and the angular velocity sensor when the device is held by a pedestrian.

14. The positioning apparatus according to claim 1, wherein the machine learning model has a configuration of a neural network.

15. The positioning apparatus according to claim 1, wherein the trajectory of the relative position of the device is displayed on a map image.

16. A positioning method, comprising:
estimating, by a movement vector estimator implemented via at least one processor included in a positioning apparatus, a movement vector using a machine learning model,
wherein the estimated movement vector indicates a movement amount and a movement direction of a device in a predetermined time period,
wherein the movement vector is estimated on a basis of input data to the machine learning model, the input data including acceleration of the device in the predetermined time period and an angular velocity of the device in the predetermined time period,
wherein the acceleration of the device is detected by an acceleration sensor that is used to detect the acceleration,
wherein the angular velocity of the device is detected by an angular velocity sensor;
integrating, by an integration section implemented via the at least one processor included in the positioning apparatus, the estimated movement vector;
calculating a relative position of the device for the predetermined time period with respect to a specified reference position in a real space; and
displaying a trajectory of the relative position of the device for the predetermined time period with respect to the specified reference position in the real space,
wherein the machine learning model is trained in advance on a basis of acceleration of one or more devices in each of a plurality of prior predetermined time periods and an angular velocity of the one or more devices in each of the plurality of prior predetermined time periods.

17. A non-transitory computer-readable storage medium having embodied thereon a program, which when executed by a computer causes the computer to execute a method, the method comprising:
estimating a movement vector using a machine learning model,
wherein the estimated movement vector indicates a movement amount and a movement direction of a device in a predetermined time period,
wherein the movement vector is estimated on a basis of input data to the machine learning model, the input data including acceleration of the device in the predetermined time period and an angular velocity of the device in the predetermined time period,
wherein the acceleration of the device is detected by an acceleration sensor, and
wherein the angular velocity of the device is detected by an angular velocity sensor;
integrating the estimated movement vector;
calculating a relative position of the device for the predetermined time period with respect to a specified reference position in a real space; and
displaying a trajectory of the relative position of the device for the predetermined time period with respect to the specified reference position in the real space, wherein the machine learning model is trained in advance on a basis of acceleration of one or more devices in each of a plurality of prior predetermined time periods and an angular velocity of the one or more devices in each of the plurality of prior predetermined time periods.

* * * * *